United States Patent
Bhardwaj et al.

(10) Patent No.: US 12,222,447 B1
(45) Date of Patent: Feb. 11, 2025

(54) LIDAR SENSOR SYSTEM INCLUDING INTEGRATED MODULATOR

(71) Applicant: Aurora Operations, Inc., Pittsburgh, PA (US)

(72) Inventors: Ashish Bhardwaj, Fremont, CA (US); Sen Lin, Mountain View, CA (US); Dong Liu, San Jose, CA (US); Xue Liu, San Jose, CA (US); Andrew Steil Michaels, Los Altos, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/516,646

(22) Filed: Nov. 21, 2023

(51) Int. Cl.
*G01S 7/00* (2006.01)
*G01S 7/481* (2006.01)
*G01S 17/42* (2006.01)
*G01S 17/89* (2020.01)

(52) U.S. Cl.
CPC ............ *G01S 7/4816* (2013.01); *G01S 17/42* (2013.01); *G01S 17/89* (2013.01)

(58) Field of Classification Search
USPC ...................................................... 356/4.01
See application file for complete search history.

(56) References Cited

U.S. PATENT DOCUMENTS

| | | | | |
|---|---|---|---|---|
| 2013/0322806 | A1* | 12/2013 | Hoffmann | G02F 1/025 385/2 |
| 2017/0195059 | A1* | 7/2017 | Rahn | H04B 10/516 |
| 2017/0317750 | A1* | 11/2017 | Chaffee | H04B 10/40 |
| 2019/0342009 | A1* | 11/2019 | Evans | G02B 6/4279 |
| 2020/0116930 | A1* | 4/2020 | Kannan | G02B 6/122 |
| 2020/0150240 | A1* | 5/2020 | Huwer | G01S 7/4865 |
| 2021/0201126 | A1* | 7/2021 | Meng | G02F 3/00 |
| 2021/0242944 | A1* | 8/2021 | Chaffee | G01S 7/484 |
| 2021/0257396 | A1* | 8/2021 | Piggott | H01L 27/1464 |
| 2022/0159860 | A1* | 5/2022 | Winzer | G02B 6/4278 |
| 2022/0179159 | A1* | 6/2022 | Wu | G02B 6/4204 |
| 2022/0244465 | A1* | 8/2022 | Winzer | G02B 6/3825 |
| 2022/0264759 | A1* | 8/2022 | Sawyer | G06F 1/20 |
| 2022/0390562 | A1* | 12/2022 | Bai | G01S 17/931 |
| 2023/0018654 | A1* | 1/2023 | Winzer | G02B 6/4285 |
| 2023/0077979 | A1* | 3/2023 | Winzer | H04B 10/801 398/116 |
| 2023/0112479 | A1* | 4/2023 | Chen | H01L 31/022408 257/431 |

FOREIGN PATENT DOCUMENTS

WO    WO-2020191217 A1 *  9/2020   ............. G02F 1/225

* cited by examiner

*Primary Examiner* — James R Hulka
(74) *Attorney, Agent, or Firm* — Dority & Manning, P.A.

(57) ABSTRACT

A light detection and ranging (LIDAR) system for a vehicle can include: a light source configured to output a beam; a photonics integrated circuit (PIC) including a semiconductor die, the semiconductor die comprising a substrate having two or more semiconductor devices formed on the substrate, the two or more semiconductor devices configured to receive the beam from the light source and modify the beam and at least one photonics die coupled to the semiconductor die, the at least one photonics die comprising at least a transmitter configured to receive the beam from the semiconductor die; and one or more optics configured to receive the beam from the transmitter and emit the beam towards an object in an environment of the vehicle.

18 Claims, 8 Drawing Sheets

LIDAR SENSOR SYSTEM INCLUDING INTEGRATED MODULATOR

BACKGROUND

Light Detection and Ranging (LIDAR) systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment.

SUMMARY

Aspects and advantages of implementations of the present disclosure will be set forth in part in the following description, or may be learned from the description, or may be learned through practice of the implementations.

Example aspects of the present disclosure are directed to LIDAR systems. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

The technology of the present disclosure is directed to an integrated and co-packaged assemblies of silicon photonics dies with group III-V semiconductor dies to improve performance of LIDAR systems. In particular, a group III-V semiconductor die can include one or more semiconductor devices, such as modulators, preamplifiers, and/or amplifiers respectively associated with a channel on the semiconductor die. The group III-V die can be coupled to a photonics die that feeds a light beam to the channels of the group III-V die.

One example implementation of this technology is a photonic integrated circuit having a group III-V die coupled to a silicon photonics die. The silicon photonics die includes a light source (e.g., a seed laser) that directs a beam to a modulator. The modulator is configured to modulate the beam to produce a modulated beam. The modulator can be configured to modulate phase and/or frequency of the light source such that the modulated beam can include a phase-modulated beam and/or a frequency-modulated beam. The modulated beam is provided to an amplifier formed of one or more channels of the group III-V die. The amplifier is configured to amplify the beam to produce an amplified beam. The amplified beam is provided to a transceiver chip configured to emit the amplified beam at a target and receive a reflected beam from the target. A LIDAR system can determine a distance to the target and/or velocity of the target based on the reflected beam.

Another example implementation of this technology is a photonic integrated circuit having a semiconductor die (e.g., a group III-V semiconductor die) coupled to a silicon photonics die. The silicon photonics die includes a light source (e.g., a seed laser) that feeds a beam to a modulator formed as a channel of the semiconductor die. The modulator is configured to modulate the beam to produce a modulated beam which is then fed to an amplifier formed of one or more channels of the same semiconductor die. The amplifier can amplify the modulated beam to produce an amplified beam, which can then be provided to a transceiver chip configured to emit the amplified beam at an object and receive a reflected beam from the object. A LIDAR system can determine a distance to the object and/or velocity of the object based on the reflected beam.

Furthermore, in another example implementation, the semiconductor die includes both a preamplifier stage and an amplifier stage respectively formed of one or more channels on the same semiconductor die. The preamplifier stage can produce a preamplified beam that is amplified compared to the modulated beam, but is not yet amplified to an intensity for LIDAR applications. The amplifier stage can amplify the preamplified beam to an intensity for LIDAR applications to produce the amplified beam that is provided to the transceiver chip. Although the preamplifier stage and the amplifier stage can operate independently, they can be formed on the same group III-V die.

In some implementations, the one or more channels formed in the semiconductor die can be arranged in different directions. For example, one or more channels formed in the semiconductor die can be configured to direct light in a first direction, while one or more other channels formed in the semiconductor die can be configured to direct light in a second direction that is substantially parallel to but opposite the first direction. For example, one or more channels associated with a first semiconductor device (e.g., a preamplifier) can be configured to direct light in the first direction, while one or more channels associated with a second semiconductor device (e.g., a modulator and/or amplifier) can be configured to direct light in the second direction.

In keeping with such implementations, the semiconductor die can be characterized by a particular facet (e.g., a first facet, such as the facet that is coupled to the at least one photonics die). An input of at least a first channel of the one or more channels of the semiconductor die and an output of at least a second channel of the one or more channels of the semiconductor die are positioned on the particular facet of the semiconductor die. The semiconductor die can be further characterized by another particular facet (e.g., a second facet opposite the first facet, such as the facet that is coupled to a transceiver die/chip). Similar to the first facet, an input of at least a third channel of the one or more channels of the semiconductor die and an output of at least a fourth channel of the one or more channels of the semiconductor die are positioned on the second facet of the semiconductor die.

The semiconductor devices of the group III-V die can be formed by parallel regrowth, where multiple different semiconductor devices can be separately grown and cointegrated on the same die without requiring the devices to be joined by a butt joint. In particular, the devices can be grown on the same substrate by first growing a regrowth on multiple semiconductor stacks and etching away the portion of the regrowth on the semiconductor stack(s) not associated with the device for which the layer is grown. New layers for the other semiconductor device(s) are then grown in the previously etched regions. As a result, a substrate is formed having multiple independently-acting semiconductor devices formed on a single substrate, without requiring those devices to be joined by a butt joint. By eliminating the butt joint, the devices can avoid optical loss and manufacturing inefficiencies associated with the butt joint, thereby improving the quality of the LIDAR systems utilizing the semiconductor devices.

A LIDAR system according to the present disclosure can provide numerous technical effects and benefits. For instance, the LIDAR systems according to the present disclosure can include multiple types of semiconductor devices (e.g., modulators, amplifiers, etc.) on a common substrate. Additionally, the semiconductor devices can be interfaced without requiring a butt joint or other combinative manufacturing. In this manner, the devices can have reduced manufacturing costs, increased manufacturing efficiency, and/or improved performance compared to some existing LIDAR systems.

Furthermore, in some cases, it can be beneficial to use group III-V semiconductor devices to generate light as other semiconductors (e.g., silicon) may be unable to or may provide reduced performance at generating light. Example aspects of the present disclosure provide a highly efficient architecture for providing high power light signals in an integrated chip that can easily be incorporated into a larger system (e.g., a LIDAR system).

For example, in an aspect, the present disclosure provides for a light detection and ranging (LIDAR) system for a vehicle. The LIDAR system includes: a light source configured to output a beam; a photonics integrated circuit (PIC) including a semiconductor die, the semiconductor die comprising a substrate having two or more semiconductor devices formed on the substrate, the two or more semiconductor devices configured to receive the beam from the light source and modify the beam and at least one photonics die coupled to the semiconductor die, the at least one photonics die comprising at least a transmitter configured to receive the beam from the semiconductor die; and one or more optics configured to receive the beam from the transmitter and emit the beam towards an object in an environment of the vehicle.

In some implementations, the semiconductor die includes one or more channels, at least one of the one or more channels respectively including the one or more semiconductor devices, and the at least one photonics die includes one or more waveguides respectively coupled to the one or more channels.

In some implementations, the semiconductor die has a particular facet. In some implementations, an input of at least a first channel of the one or more channels and an output of at least a second channel of the one or more channels are positioned on the particular facet of the semiconductor die.

In some implementations, the at least one photonics die includes a power distribution network configured to receive the beam and distribute the beam to the one or more channels of the one or more semiconductor devices.

In some implementations, the at least one photonics die includes at least one silicon photonics die.

In some implementations the semiconductor die is a group 11-V semiconductor die, and the one or more semiconductor devices include one or more group III-V semiconductor devices.

In some implementations, the group III-V semiconductor devices include indium phosphide devices, boron nitride devices, or gallium arsenide devices.

In some implementations, at least one of the two or more semiconductor devices is a modulator, the modulator configured to receive the beam from the light source and modulate the beam.

In some implementations, at least one of the two or more semiconductor devices is an amplifier stage, the amplifier stage configured to receive the beam from the light source and amplify the beam.

In some implementations, the two or more semiconductor devices include a preamplifier stage configured to receive the beam from the light source and amplify the beam to a particular amplitude and provide the beam at the particular amplitude to the amplifier stage.

In some implementations, a respective semiconductor stack makes up each of the two or more semiconductor devices on the substrate. In some implementations, the respective semiconductor stacks of the one or more semiconductor devices are isolated.

In some implementations, the at least one photonics die further includes a receiver configured to receive a reflected beam from the one or more optics, the reflected beam being reflected from the object.

In some implementations, the at least one photonics die includes a transceiver die, wherein the transmitter and the receiver are disposed on the transceiver die.

For example, in an aspect, the present disclosure provides for an autonomous vehicle control system. The autonomous vehicle control system includes a photonics integrated circuit (PIC), the PIC including: a semiconductor die, the semiconductor die including a substrate having two or more semiconductor devices directly formed on the substrate, the two or more semiconductor devices configured to receive a beam from a light source and modify the beam; and at least one photonics die coupled to the semiconductor die, the at least one photonics die including at least a transmitter configured to receive the beam from the semiconductor die.

In some implementations, the semiconductor die is a group 111-V semiconductor die, and the one or more semiconductor devices includes one or more group III-V semiconductor devices.

In some implementations, at least one of the two or more semiconductor devices is a modulator, the modulator configured to receive the beam from the light source and modulate the beam.

In some implementations, at least one of the two or more semiconductor devices is an amplifier stage, the amplifier stage configured to receive the beam from the light source and amplify the beam.

In some implementations, the two or more semiconductor devices include a preamplifier stage configured to receive the beam from the light source and amplify the beam to a particular amplitude and provide the beam at the particular amplitude to the amplifier stage.

In some implementations, a respective semiconductor stack makes up each of the two or more semiconductor devices on the substrate. In some implementations, the respective semiconductor stacks of the one or more semiconductor devices are isolated.

For example, in an aspect, the present disclosure provides for an autonomous vehicle. The autonomous vehicle includes an autonomous vehicle control system, the autonomous vehicle control system including: one or more processors; and a light detection and ranging (LIDAR) system. The LIDAR system includes: a light source configured to output a beam; a photonics integrated circuit (PIC) including a semiconductor die, the semiconductor die comprising a substrate having two or more semiconductor devices formed on the substrate, the two or more semiconductor devices configured to receive the beam from the light source and modify the beam and at least one photonics die coupled to the semiconductor die, the at least one photonics die comprising at least a transmitter configured to receive the beam from the semiconductor die; and one or more optics configured to receive the beam from the transmitter and emit the beam towards an object in an environment of the vehicle.

Other example aspects of the present disclosure are directed to other systems, methods, vehicles, apparatuses, tangible non-transitory computer-readable media, and devices for motion prediction and/or operation of a device including a LIDAR system having a LIDAR module according to example aspects of the present disclosure.

These and other features, aspects and advantages of various implementations of the present disclosure will become better understood with reference to the following description and appended claims. The accompanying drawings, which are incorporated in and constitute a part of this specification, illustrate implementations of the present disclosure and, together with the description, serve to explain the related principles.

DETAILED DESCRIPTION

The following describes the technology of this disclosure within the context of an autonomous vehicle for example purposes only. As described herein, the technology is not limited to an autonomous vehicle and can be implemented within other robotic and computing systems as well as various devices. For example, the systems and methods disclosed herein can be implemented in a variety of ways including, but not limited to, a computer-implemented method, an autonomous vehicle system, an autonomous vehicle control system, a robotic platform system, a general robotic device control system, a computing device, etc.

Figure 1:
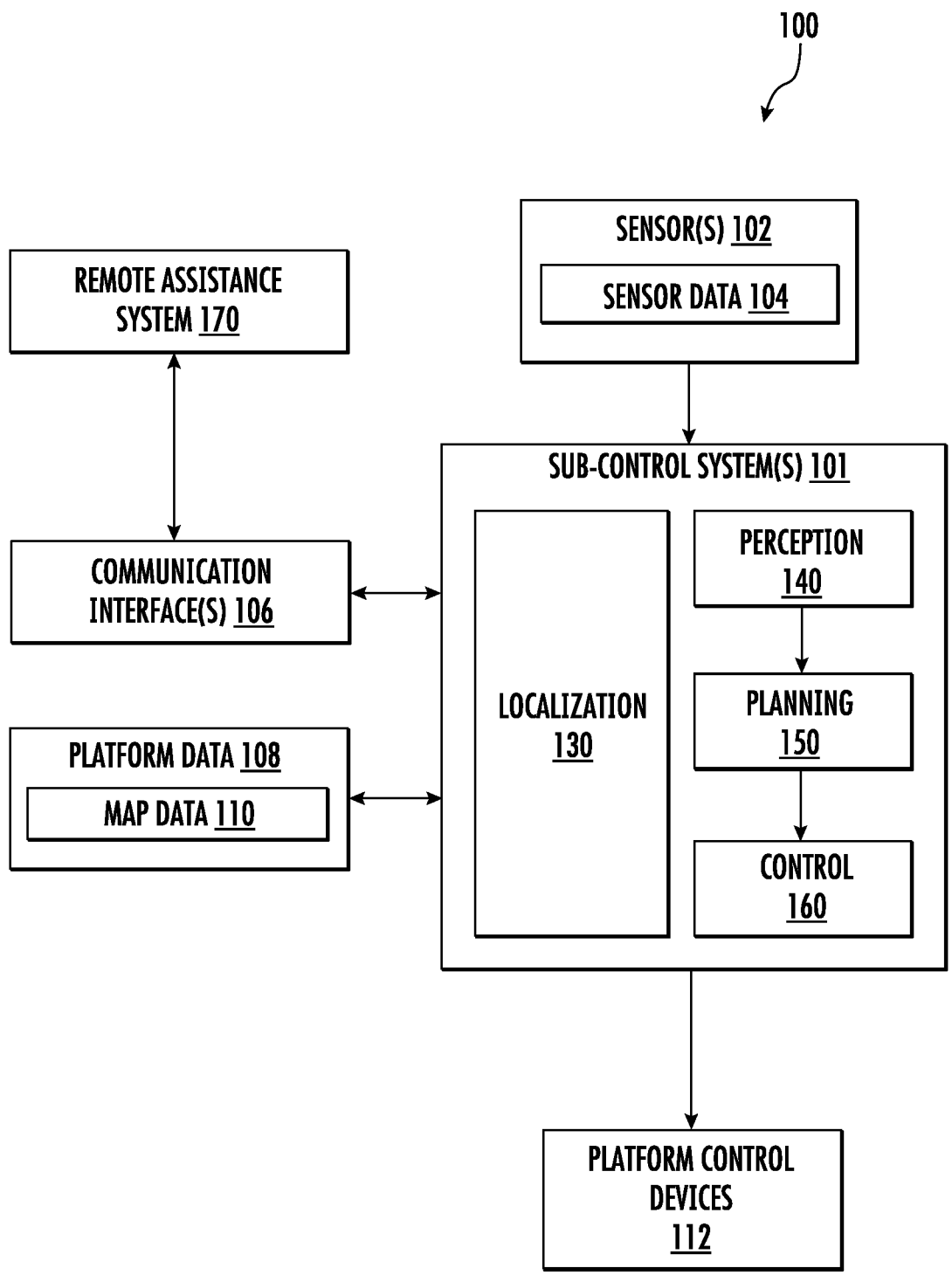
FIG. 1 depicts a block diagram of an example system according to some implementations of the present disclosure.

With reference to FIGS. 1-9, example implementations of the present disclosure are discussed in further detail. FIG. 1 depicts a block diagram of an example autonomous vehicle control system 100 for an autonomous vehicle according to some implementations of the present disclosure. The autonomous vehicle control system 100 can be implemented by a computing system of an autonomous vehicle). The autonomous vehicle control system 100 can include one or more sub-control systems 101 that operate to obtain inputs from sensor(s) 102 or other input devices of the autonomous vehicle control system 100. In some implementations, the sub-control system(s) 101 can additionally obtain platform data 108 (e.g., map data 110) from local or remote storage. The sub-control system(s) 101 can generate control outputs for controlling the autonomous vehicle (e.g., through platform control devices 112, etc.) based on sensor data 104, map data 110, or other data. The sub-control system 101 may include different subsystems for performing various autonomy operations. The subsystems may include a localization system 130, a perception system 140, a planning system 150, and a control system 160. The localization system 130 can determine the location of the autonomous vehicle within its environment; the perception system 140 can detect, classify, and track objects and actors in the environment; the planning system 150 can determine a trajectory for the autonomous vehicle; and the control system 160 can translate the trajectory into vehicle controls for controlling the autonomous vehicle. The sub-control system(s) 101 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the sub-control system(s) 101 can be shared among its subsystems, or a subsystem can have a set of dedicated computing resources.

In some implementations, the autonomous vehicle control system 100 can be implemented for or by an autonomous vehicle (e.g., a ground-based autonomous vehicle). The autonomous vehicle control system 100 can perform various processing techniques on inputs (e.g., the sensor data 104, the map data 110) to perceive and understand the vehicle's surrounding environment and generate an appropriate set of control outputs to implement a vehicle motion plan (e.g., including one or more trajectories) for traversing the vehicle's surrounding environment. In some implementations, an autonomous vehicle implementing the autonomous vehicle control system 100 can drive, navigate, operate, etc. with minimal or no interaction from a human operator (e.g., driver, pilot, etc.).

In some implementations, the autonomous vehicle can be configured to operate in a plurality of operating modes. For instance, the autonomous vehicle can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous vehicle can operate in a semi-autonomous operating mode in which the autonomous vehicle can operate with some input from a human operator present in the autonomous vehicle (or a human operator that is remote from the autonomous platform). In some implementations, the autonomous vehicle can enter into a manual operating mode in which the autonomous vehicle is fully controllable by a human operator (e.g., human driver, etc.) and can be prohibited or disabled (e.g., temporary, permanently, etc.) from performing autonomous navigation (e.g., autonomous driving, etc.). The autonomous vehicle can be configured to operate in other modes such as, for example, park or sleep modes (e.g., for use between tasks such as waiting to provide a trip/service, recharging, etc.). In some implementations, the autonomous vehicle can implement vehicle operating assistance technology (e.g., collision mitigation system, power assist steering, etc.), for example, to help assist the human operator of the autonomous platform (e.g., while in a manual mode, etc.).

The autonomous vehicle control system 100 can be located onboard (e.g., on or within) an autonomous vehicle and can be configured to operate the autonomous vehicle in various environments. The environment may be a real-world environment or a simulated environment. In some implementations, one or more simulation computing devices can simulate one or more of: the sensors 102, the sensor data 104, communication interface(s) 106, the platform data 108, or the platform control devices 112 for simulating operation of the autonomous vehicle control system 100.

In some implementations, the sub-control system(s) 101 can communicate with one or more networks or other systems with communication interface(s) 106. The communication interface(s) 106 can include any suitable components for interfacing with one or more network(s), including, for example, transmitters, receivers, ports, controllers, antennas, or other suitable components that can help facilitate communication. In some implementations, the communication interface(s) 106 can include a plurality of components (e.g., antennas, transmitters, or receivers, etc.) that allow it to implement and utilize various communication techniques (e.g., multiple-input, multiple-output (MIMO) technology, etc.).

In some implementations, the sub-control system(s) 101 can use the communication interface(s) 106 to communicate with one or more computing devices that are remote from the autonomous vehicle over one or more network(s). For instance, in some examples, one or more inputs, data, or functionalities of the sub-control system(s) 101 can be supplemented or substituted by a remote system communicating over the communication interface(s) 106. For instance, in some implementations, the map data 110 can be downloaded over a network to a remote system using the communication interface(s) 106. In some examples, one or more of the localization system 130, the perception system 140, the planning system 150, or the control system 160 can be updated, influenced, nudged, communicated with, etc. by a remote system for assistance, maintenance, situational response override, management, etc.

The sensor(s) 102 can be located onboard the autonomous platform. In some implementations, the sensor(s) 102 can include one or more types of sensor(s). For instance, one or more sensors can include image capturing device(s) (e.g., visible spectrum cameras, infrared cameras, etc.). Additionally or alternatively, the sensor(s) 102 can include one or more depth capturing device(s). For example, the sensor(s) 102 can include one or more LIDAR sensor(s) or Radio Detection and Ranging (RADAR) sensor(s). The sensor(s) 102 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 102 for capturing depth information can be fixed to a rotational device in order to rotate the sensor(s) 102 about an axis. The sensor(s) 102 can be rotated about the axis while capturing data in interval sector packets descriptive of different portions of a three-hundred-and-sixty-degree view of a surrounding environment of the autonomous platform. In some implementations, one or more of the sensor(s) 102 for capturing depth information can be solid state.

The sensor(s) 102 can be configured to capture the sensor data 104 indicating or otherwise being associated with at least a portion of the environment of the autonomous vehicle. The sensor data 104 can include image data (e.g., 2D camera data, video data, etc.), RADAR data, LIDAR data (e.g., 3D point cloud data, etc.), audio data, or other types of data. In some implementations, the sub-control system(s) 101 can obtain input from additional types of sensors, such as inertial measurement units (IMUs), altimeters, inclinometers, odometry devices, location or positioning devices (e.g., GPS, compass), wheel encoders, or other types of sensors. In some implementations, the sub-control system(s) 101 can obtain sensor data 104 associated with particular component(s) or system(s) of the autonomous vehicle. This sensor data 104 can indicate, for example, wheel speed, component temperatures, steering angle, cargo or passenger status, etc. In some implementations, the sub-control system(s) 101 can obtain sensor data 104 associated with ambient conditions, such as environmental or weather conditions. In some implementations, the sensor data 104 can include multi-modal sensor data. The multi-modal sensor data can be obtained by at least two different types of sensor(s) (e.g., of the sensors 102) and can indicate static and/or dynamic object(s) or actor(s) within an environment of the autonomous vehicle. The multi-modal sensor data can include at least two types of sensor data (e.g., camera and LIDAR data). In some implementations, the autonomous vehicle can utilize the sensor data 104 for sensors that are remote from (e.g., offboard) the autonomous vehicle. This can include for example, sensor data104 captured by a different autonomous vehicle.

The sub-control system(s) 101 can obtain the map data 110 associated with an environment in which the autonomous vehicle was, is, or will be located. The map data 110 can provide information about an environment or a geographic area. For example, the map data 110 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous vehicle in understanding its surrounding environment and its relationship thereto. In some implementations, the map data 110 can include high-definition map information. Additionally or alternatively, the map data 110 can include sparse map data (e.g., lane graphs, etc.). In some implementations, the sensor data 104 can be fused with or used to update the map data 110 in real time.

The sub-control system(s) 101 can include the localization system 130, which can provide an autonomous vehicle with an understanding of its location and orientation in an environment. In some examples, the localization system 130 can support one or more other subsystems of the sub-control system(s) 101, such as by providing a unified local reference frame for performing, e.g., perception operations, planning operations, or control operations.

In some implementations, the localization system 130 can determine a current position of the autonomous vehicle. A current position can include a global position (e.g., respecting a georeferenced anchor, etc.) or relative position (e.g., respecting objects in the environment, etc.). The localization system 130 can generally include or interface with any device or circuitry for analyzing a position or change in position of an autonomous vehicle. For example, the localization system 130 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous vehicle can be used by various subsystems of the sub-control system(s) 101 or provided to a remote computing system (e.g., using the communication interface(s) 106).

In some implementations, the localization system 130 can register relative positions of elements of a surrounding environment of the autonomous vehicle with recorded positions in the map data 110. For instance, the localization system 130 can process the sensor data 104 (e.g., LIDAR data, RADAR data, camera data, etc.) for aligning or otherwise registering to a map of the surrounding environment (e.g., from the map data 110) to understand the autonomous vehicle's position within that environment. Accordingly, in some implementations, the autonomous vehicle can identify its position within the surrounding environment (e.g., across six axes, etc.) based on a search over the map data 110. In some implementations, given an initial location, the localization system 130 can update the autonomous vehicle's location with incremental re-alignment based on recorded or estimated deviations from the initial location. In some implementations, a position can be registered directly within the map data 110.

In some implementations, the map data 110 can include a large volume of data subdivided into geographic tiles, such that a desired region of a map stored in the map data 110 can be reconstructed from one or more tiles. For instance, a plurality of tiles selected from the map data 110 can be stitched together by the sub-control system 101 based on a position obtained by the localization system 130 (e.g., a number of tiles selected in the vicinity of the position).

In some implementations, the localization system 130 can determine positions (e.g., relative or absolute) of one or more attachments or accessories for an autonomous vehicle. For instance, an autonomous vehicle can be associated with a cargo platform, and the localization system 130 can provide positions of one or more points on the cargo platform. For example, a cargo platform can include a trailer or other device towed or otherwise attached to or manipulated by an autonomous vehicle, and the localization system 130 can provide for data describing the position (e.g., absolute, relative, etc.) of the autonomous vehicle as well as the cargo platform. Such information can be obtained by the other autonomy systems to help operate the autonomous vehicle.

The sub-control system(s) 101 can include the perception system 140, which can allow an autonomous platform to detect, classify, and track objects and actors in its environment. Environmental features or objects perceived within an environment can be those within the field of view of the sensor(s) 102 or predicted to be occluded from the sensor(s) 102. This can include object(s) not in motion or not predicted to move (static objects) or object(s) in motion or predicted to be in motion (dynamic objects/actors).

The perception system 140 can determine one or more states (e.g., current or past state(s), etc.) of one or more objects that are within a surrounding environment of an autonomous vehicle. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 140 can determine the state(s) using one or more algorithms or machine-learned models configured to identify/classify objects based on inputs from the sensor(s) 102. The perception system can use different modalities of the sensor data 104 to generate a representation of the environment to be processed by the one or more algorithms or machine-learned models. In some implementations, state(s) for one or more identified or unidentified objects can be maintained and updated over time as the autonomous vehicle continues to perceive or interact with the objects (e.g., maneuver with or around, yield to, etc.). In this manner, the perception system 140 can provide an understanding about a current state of an environment (e.g., including the objects therein, etc.) informed by a record of prior states of the environment (e.g., including movement histories for the objects therein). Such information can be helpful as the autonomous vehicle plans its motion through the environment.

The sub-control system(s) 100 can include the planning system 150, which can be configured to determine how the autonomous platform is to interact with and move within its environment. The planning system 150 can determine one or more motion plans for an autonomous platform. A motion plan can include one or more trajectories (e.g., motion trajectories) that indicate a path for an autonomous vehicle to follow. A trajectory can be of a certain length or time range. The length or time range can be defined by the computational planning horizon of the planning system 150. A motion trajectory can be defined by one or more waypoints (with associated coordinates). The waypoint(s) can be future location(s) for the autonomous platform. The motion plans can be continuously generated, updated, and considered by the planning system 150.

The planning system 150 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 150 can determine a desired trajectory for executing a strategy. For instance, the planning system 150 can obtain one or more trajectories for executing one or more strategies. The planning system 150 can evaluate trajectories or strategies (e.g., with scores, costs, rewards, constraints, etc.) and rank them. For instance, the planning system 150 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 150 can utilize static cost(s) to evaluate trajectories for the autonomous platform (e.g., "avoid lane boundaries," "minimize jerk," etc.). Additionally or alternatively, the planning system 150 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 150 can rank trajectories based on one or more static costs, one or more dynamic costs, or a combination thereof. The planning system 150 can select a motion plan (and a corresponding trajectory) based on a ranking of a plurality of candidate trajectories. In some implementations, the planning system 150 can select a highest ranked candidate, or a highest ranked feasible candidate.

The planning system 150 can then validate the selected trajectory against one or more constraints before the trajectory is executed by the autonomous platform.

To help with its motion planning decisions, the planning system 150 can be configured to perform a forecasting function. The planning system 150 can forecast future state(s) of the environment. This can include forecasting the future state(s) of other actors in the environment. In some implementations, the planning system 150 can forecast future state(s) based on current or past state(s) (e.g., as developed or maintained by the perception system 140). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous vehicle. Additionally or alternatively, the probabilities can include probabilities conditioned on trajectory options available to one or more other actors.

To implement selected motion plan(s), the sub-control system(s) 101 can include a control system 160 (e.g., a vehicle control system). Generally, the control system 160 can provide an interface between the sub-control system(s) 101 and the platform control devices 112 for implementing the strategies and motion plan(s) generated by the planning system 150. For instance, the control system 160 can implement the selected motion plan/trajectory to control the autonomous platform's motion through its environment by following the selected trajectory (e.g., the waypoints included therein). The control system 160 can, for example, translate a motion plan into instructions for the appropriate platform control devices 112 (e.g., acceleration control, brake control, steering control, etc.). By way of example, the control system 160 can translate a selected motion plan into instructions to adjust a steering component (e.g., a steering angle) by a certain number of degrees, apply a certain magnitude of braking force, increase/decrease speed, etc. In some implementations, the control system 160 can communicate with the platform control devices 112 through communication channels including, for example, one or more data buses (e.g., controller area network (CAN), etc.), onboard diagnostics connectors (e.g., OBD-II, etc.), or a combination of wired or wireless communication links. The platform control devices 112 can send or obtain data, messages, signals, etc. to or from the sub-control system(s) 101 (or vice versa) through the communication channel(s).

The sub-control system(s) 101 can receive, through communication interface(s) 106, assistive signal(s) from remote assistance system 170. Remote assistance system 170 can communicate with the sub-control system(s) 101 over a network. In some implementations, the sub-control system(s) 101 can initiate a communication session with the remote assistance system 170. For example, the sub-control system(s) 101 can initiate a session based on or in response to a trigger. In some implementations, the trigger may be an alert, an error signal, a map feature, a request, a location, a traffic condition, a road condition, etc.

After initiating the session, the sub-control system(s) 101 can provide context data to the remote assistance system 170. The context data may include sensor data 104 and state data of the autonomous vehicle. For example, the context data may include a live camera feed from a camera of the autonomous vehicle and the autonomous vehicle's current speed. An operator (e.g., human operator) of the remote assistance system 170 can use the context data to select assistive signals. The assistive signal(s) can provide values or adjustments for various operational parameters or characteristics for the sub-control system(s) 101. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the sub-control system(s) 101.

The sub-control system(s) 101 can use the assistive signal(s) for input into one or more autonomy subsystems for performing autonomy functions. For instance, the planning system 150 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning system 150. Additionally or alternatively, assistive signal(s) can be considered by the sub-control system(s) 101 as suggestive inputs for consideration in addition to other received data (e.g., sensor inputs, etc.).

The sub-control system(s) 101 may be platform agnostic, and the control system 160 can provide control instructions to platform control devices 112 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 2:
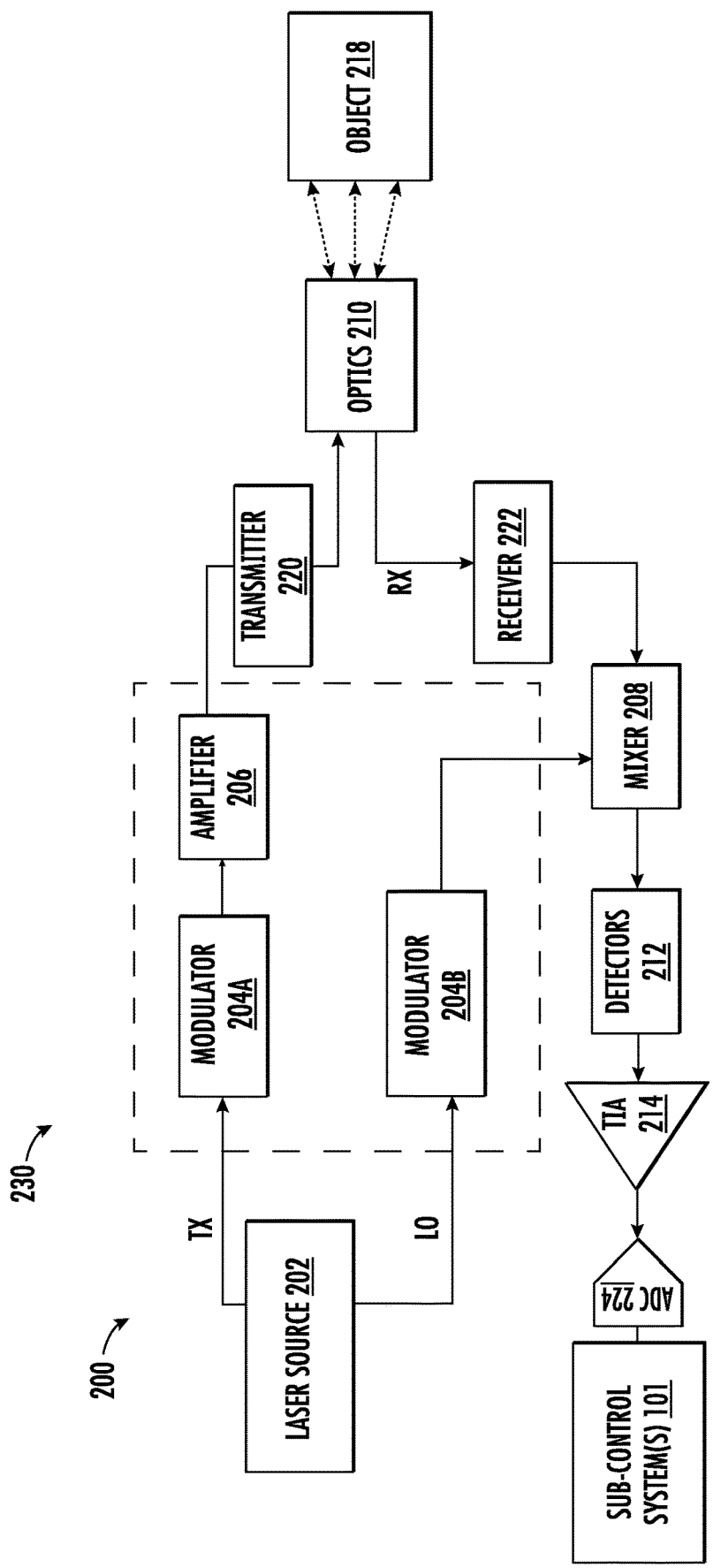
FIG. 2 depicts a block diagram of an example LIDAR system according to some implementations of the present disclosure.

FIG. 2 is a block diagram illustrating an example LIDAR sensor system for autonomous vehicles, according to some implementations. The environment includes a LIDAR system 200 that includes a transmit (Tx) path and a receive (Rx) path. The Tx path includes one or more Tx input/output ports, and the Rx path includes one or more Rx input/output ports. In some implementations, a semiconductor substrate and/or semiconductor package may include the Tx path and the Rx. In some implementations, the semiconductor substrate and/or semiconductor package may include at least one of silicon photonics circuitry, programmable logic controller (PLC), or III-V semiconductor circuitry.

In some implementations, a first semiconductor substrate and/or a first semiconductor package may include the Tx path and a second semiconductor substrate and/or a second semiconductor package may include the Rx path. In some arrangements, the Rx input/output ports and/or the Tx input/output ports may occur (or be formed/disposed/located/placed) along one or more edges of one or more semiconductor substrates and/or semiconductor packages.

The LIDAR system 200 includes one or more transmitters 220 and one or more receivers 222. The LIDAR system 200 further includes one or more optics 210 (e.g., an oscillatory scanner, a unidirectional scanner, a Risley prism, a circulator optic, and/or a beam collimator, etc.) that are coupled to the LIDAR system 200 (e.g., the transmitter 220 and/or receiver 222). In some implementations, the one or more optics 210 may be coupled to the Tx path via the one or more Tx input/output ports. In some implementations, the one or more optics 210 may be coupled to the Rx path via the one or more Rx input/output ports.

The LIDAR system 200 can be coupled to one or more sub-control system(s) 101—(e.g., the sub-control system(s) 101 of FIG. 1). In some implementations, the sub-control system(s) 101 may be coupled to the Rx path via the one or more Rx input/output ports. For instance, the sub-control system(s) 101 can receive LIDAR outputs from the LIDAR system 200. The sub-control system(s) 101 can control a vehicle (e.g., an autonomous vehicle) based on the LIDAR outputs.

The Tx path may include a laser source 202, a modulator 204A, a modulator 204B, an amplifier 206, and one or more transmitters 220. The Rx path may include one or more receivers 222, a mixer 208, a detector 212, a transimpedance amplifier (TIA) 214, and one or more analog-to-digital converters (ADCs). Although FIG. 2 shows only a select number of components and only one input/output channel, the LIDAR system 200 may include any number of components and/or input/output channels (in any combination) that are interconnected in any arrangement to facilitate combining multiple functions of a LIDAR system, to support the operation of a vehicle.

The laser source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1440 nanometers.

The laser source 202 may be configured to provide the light signal to the modulator 204A, which is configured to modulate a phase and/or a frequency of the light signal based on a first radio frequency (RF) signal (e.g., an "RF1" signal) to generate a modulated light signal, such as by Continuous Wave (CW) modulation or quasi-CW modulation. The modulator 204A may be configured to send the modulated light signal to the amplifier 206. The amplifier 206 may be configured to amplify the modulated light signal to generate an amplified light signal to the optics 210 via the one or more transmitters 220. The one or more transmitters 220 may include one or more optical waveguides or antennas. In some implementations, modulator 204A and/or modulator 204B may have a bandwidth between 400 megahertz (MHz) and 1000 (MHz).

According to example aspects of the present disclosure, the modulator 204A, the modulator 204B, and/or the amplifier 206 can be disposed in a photonics integrated circuit (PIC) 230. The photonics integrated circuit 230 can include one or more semiconductor devices (e.g., the modulator 204A/204 and/or the amplifier 206) formed on a common substrate. Furthermore, the different semiconductor devices can have differing semiconductor stacks. For example, the modulator 204A can have a first semiconductor stack while the amplifier 206 can have a second semiconductor stack. Additionally or alternatively, the amplifier can be formed of a group III-V semiconductor stack while the modulator 204 can be formed of another semiconductor material (e.g., silicon).

The optics 210 may be configured to steer the amplified light signal that it receives from the Tx path into an environment within a given field of view toward an object 218, may receive a returned signal reflected back from the object 218, and provide the returned signal to the mixer 208 of the Rx path via the one or more receivers 222. The one or more receivers 22 may include one or more optical waveguides or antennas. In some arrangements, the transmitters 220 and the receivers 222 may collectively constitute one or more transceivers. In some arrangements, the one or more transceivers may include a monostatic transceiver or a bistatic transceiver.

The laser source 202 may be configured to provide the LO signal to the modulator 204B, which is configured to modulate a phase and/or a frequency of the LO signal based on a second RF signal (e.g., an "RF2" signal) to generate a modulated LO signal (e.g., using Continuous Wave (CW) modulation or quasi-CW modulation) and send the modulated LO signal to the mixer 208 of the Rx path. The mixer 208 may be configured to mix (e.g., combine, multiply, etc.) the modulated LO signal with the returned signal to generate a down-converted signal and send the down-converted signal to the detector 212.

In some arrangements, the mixer 208 may be configured to send the modulated LO signal to the detector 212. The detector 212 may be configured to generate an electrical signal based on the down-converted signal and send the electrical signal to the TIA 214. In some arrangements, the detector 212 may be configured to generate an electrical signal based on the down-converted signal and the modulated signal. The TIA 214 may be configured to amplify the electrical signal and send the amplified electrical signal to the sub-control system(s) 101 via the one or more ADCs 224. In some implementations, the TIA 214 may have a peak noise-equivalent power (NEP) that is less than 5 picowatts per square root Hertz (i.e., $5 \times 10^{-12}$ Watts per square root Hertz). In some implementations, the TIA 214 may have a gain between 4 kiloohms and 25 kiloohms. In some implementations, detector 212 and/or TIA 214 may have a 3-decibel bandwidth between 80 kilohertz (kHz) and 450 megahertz (MHz).

The sub-control system(s) 101 may be configured to determine a distance to the object 218 and/or measure the velocity of the object 218 based on the one or more electrical signals that it receives from the TIA via the one or more ADCs 224.

Figure 3:
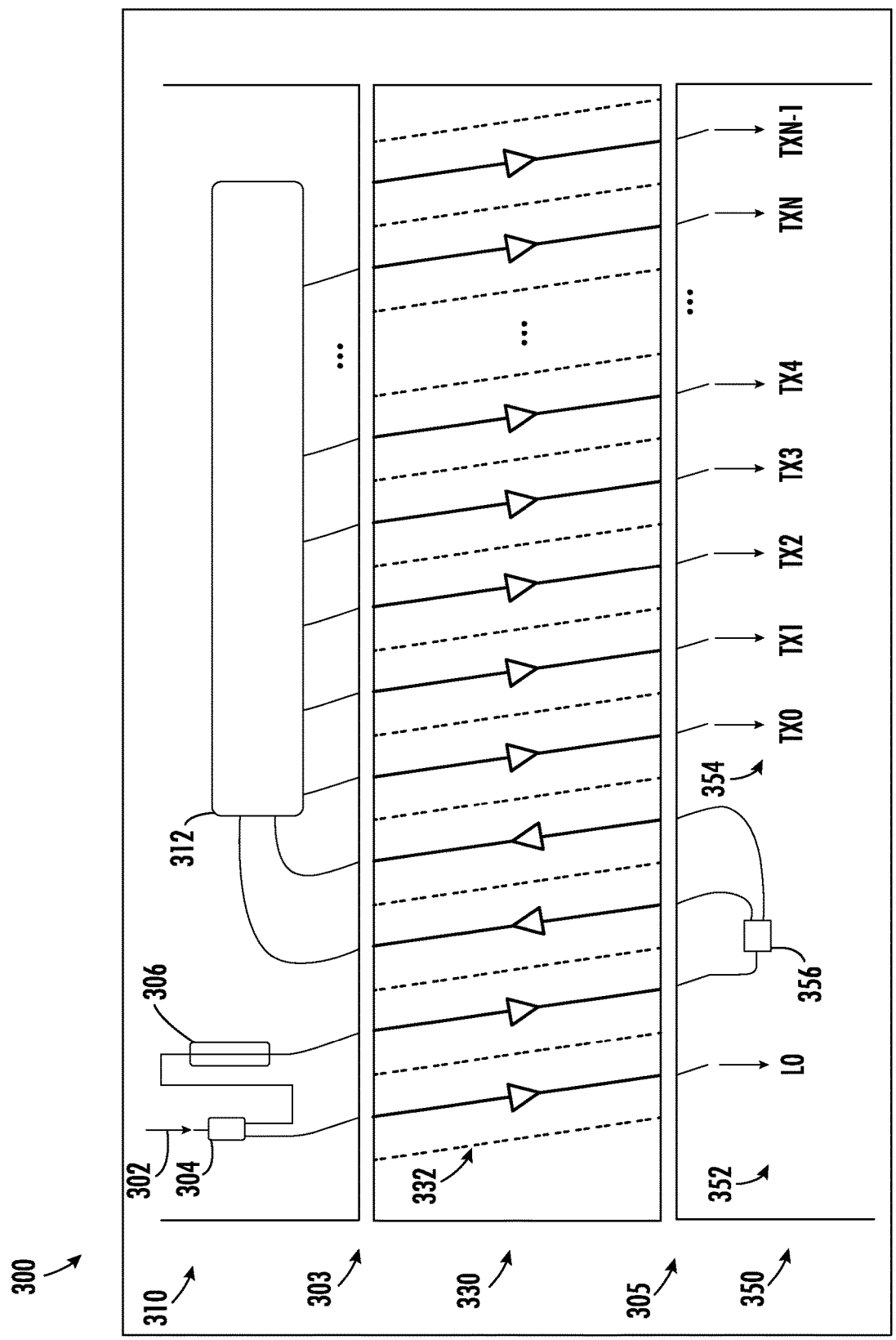
FIG. 3 depicts an example photonics integrated circuit according to some implementations of the present disclosure.

FIG. 3 depicts an example photonics integrated circuit 300 (PIC 300) according to some implementations of the present disclosure. The PIC 300 can be included in a LIDAR system, such as the LIDAR system 200 of FIG. 2.

The PIC 300 can include a semiconductor die 330. The semiconductor die 330 can include a substrate having two or more semiconductor devices directly formed on the substrate. For instance, in some implementations, the semiconductor devices can each be formed on a common substrate of the semiconductor die 330. The substrate, the semiconductor devices, and/or the semiconductor die can be formed of a group III-V semiconductor material, such as, for example, indium phosphide (InP), gallium arsenide (GaAs), indium arsenide (InAs), gallium nitride (GaN), or indium antimonide (InSb).

According to example aspects of the present disclosure, the respective semiconductor stacks of the one or more semiconductor devices of the semiconductor die 330 can be isolated, such as electrically and/or physically isolated. For instance, the respective semiconductor stacks may not be coupled by any butt joints or other joining process. For instance, in conventional manufacturing processes, disparate semiconductor stacks may be joined by butt joints or other joining processes to assemble a PIC. Rather, the semiconductor stacks are directly formed on a common substrate by a manufacturing process such as MOVCD, where layers of the semiconductor stack are formed on each semiconductor device (e.g., by a deposition process), and etched away from semiconductor stacks for devices that do not include the layer.

The semiconductor die 330 can be coupled to at least one photonics die. For instance, the semiconductor die 330 can be coupled to a first photonics die 310 by a first optical interface 303. The semiconductor die 330 can additionally or alternatively be coupled to a second photonics die 350 by a second optical interface 305. The optical interface(s) 303, 305 can be configured such that waveguides, lenses, or other structures for transmitting signals (e.g., electrical signals, light or laser signals, etc.) between the semiconductor die 330 and the first and second photonics dies 310, 350. The photonics dies 310, 350 can be silicon photonics dies. For instance, the photonics dies 310, 350 can be formed on a silicon substrate and/or formed of silicon layers.

Components depicted on the first photonics die 330 and second photonics die 350 are arranged as in FIG. 3 for the purpose of illustrating example aspects of the present disclosure. It should be understood by one having ordinary skill in the art that some components depicted on the first photonics die 310 may be positioned on the second photonics die 350 and components depicted on the second photonics die 350 may be positioned on the first photonics die 310 without deviating from the present disclosure. Still further, more or fewer photonics dies can be coupled to semiconductor die 330 without deviating from the present disclosure.

The first photonics die 310 can include or otherwise be in signal communication with a light source (e.g., laser source) 302. The laser source 302 can be configured to provide a beam (e.g., a laser beam) to the first photonics die 310 and the PIC 300. In some implementations, a local oscillator (LO) output 352 may be drawn from the laser source 302. The LO output 352 may be equivalent to the laser source 302 or may be modulated from the laser source 302 (e.g., by an LO modulator such as modulator 204B of FIG. 2). In particular, the first photonics die 310 can include a splitter 304 configured to split the beam from laser source 302 into a first beam provided to the LO output 352 and a second beam provided to other components of the PIC 300.

The laser source 302 can provide the beam to a modulator 306 (e.g., a phase modulator). The modulator 306 can be configured to modulate the beam to modify a phase and/or a frequency of the beam. In some embodiments, the modulator 306 can be a silicon phase modulator. The modulator 306 can modulate the beam by, for example, using Continuous Wave (CW) modulation or quasi-CW modulation. In some implementations, the modulator 306 can be disposed on the first photonics die 310.

The beam can be provided to one or more channels 332 of the semiconductor die 330. For instance, the channels 332 can be, can include, or can be a portion of a semiconductor device of the semiconductor die 330 configured to modify (e.g., modulate, amplify, etc.) the beam as it passes through the channels 332. For example, the channels 332 can be or can include amplification channels configured to amplify the beam as it passes through the channel. As another example, the channels 332 can be or can include modulation channels configured to modify the beam as it passes through the channels 332.

The PIC 300 (e.g., the first photonics die 310) can include a power distribution network 312. The power distribution network 312 can be configured to distribute the beam to the channels 332 of the semiconductor die 330. For instance, the power distribution network 312 can distribute the beam among the channels 332 based on power needs of the LIDAR system. Furthermore, in some implementations, the PIC 300 (e.g., the second photonics die 350) can include a splitter 356 disposed prior to the power distribution network 312 along the path of the beam through the PIC 300. Including a splitter 356 can reduce the magnitude of splitting that is later performed by power distribution network 312, which can in turn improve saturation of amplifiers in the channels 332.

The PIC 300 can further include or be in communication with a transmitter configured to receive the beam from the semiconductor die 330. For instance, in some implementations, the second photonics die 350 can include a transmitter (not illustrated in FIG. 3) configured to receive the beam from the semiconductor die 330 (e.g., the channels 332 of the semiconductor die 330). The second photonics die 350 can include one or more Tx outputs 354 (e.g., Tx0, Tx1, etc.) corresponding to output channels of a LIDAR system. The Tx outputs 354 can be provided to the transmitter and optics to emit the beam from the LIDAR system.

Furthermore, in some implementations, a photonics die (e.g., the photonics die 350) can include a receiver configured to receive a reflected beam from one or more optics. The reflected beam can be reflected from a target. For instance, the optics can emit a beam from the transmitter at a target, which is reflected by the target. The optics can capture the reflected beam and provide it to the receiver. In some implementations, the transmitter and the receiver can collectively be disposed on a common photonics die (e.g., a transceiver die).

In some implementations, the semiconductor die 330 can have a particular facet. An input of at least a first channel of the one or more channels and an output of at least a second channel of the one or more channels can be positioned on the particular facet of the semiconductor die 330. For instance, the input of the first channel and the output of the second channel can be positioned on the same facet (e.g., the same side) of the semiconductor die 330. In this manner, the PIC 300 can include one or more "u-turns" such that an optical signal input at the first channel is redirected in a direction back towards the input as it is output at the second channel. For instance, one or more waveguides on the semiconductor die 330 (and/or the photonics dies 310 or 350) can adjust a direction of propagation of the beam's input at a first direction to be substantially parallel to a second direction that is substantially opposite the first direction. In this manner, the light guided by the waveguides performs a "u-turn" back toward the inputs (e.g., towards the photonics die 310 or 350).

Figure 4:
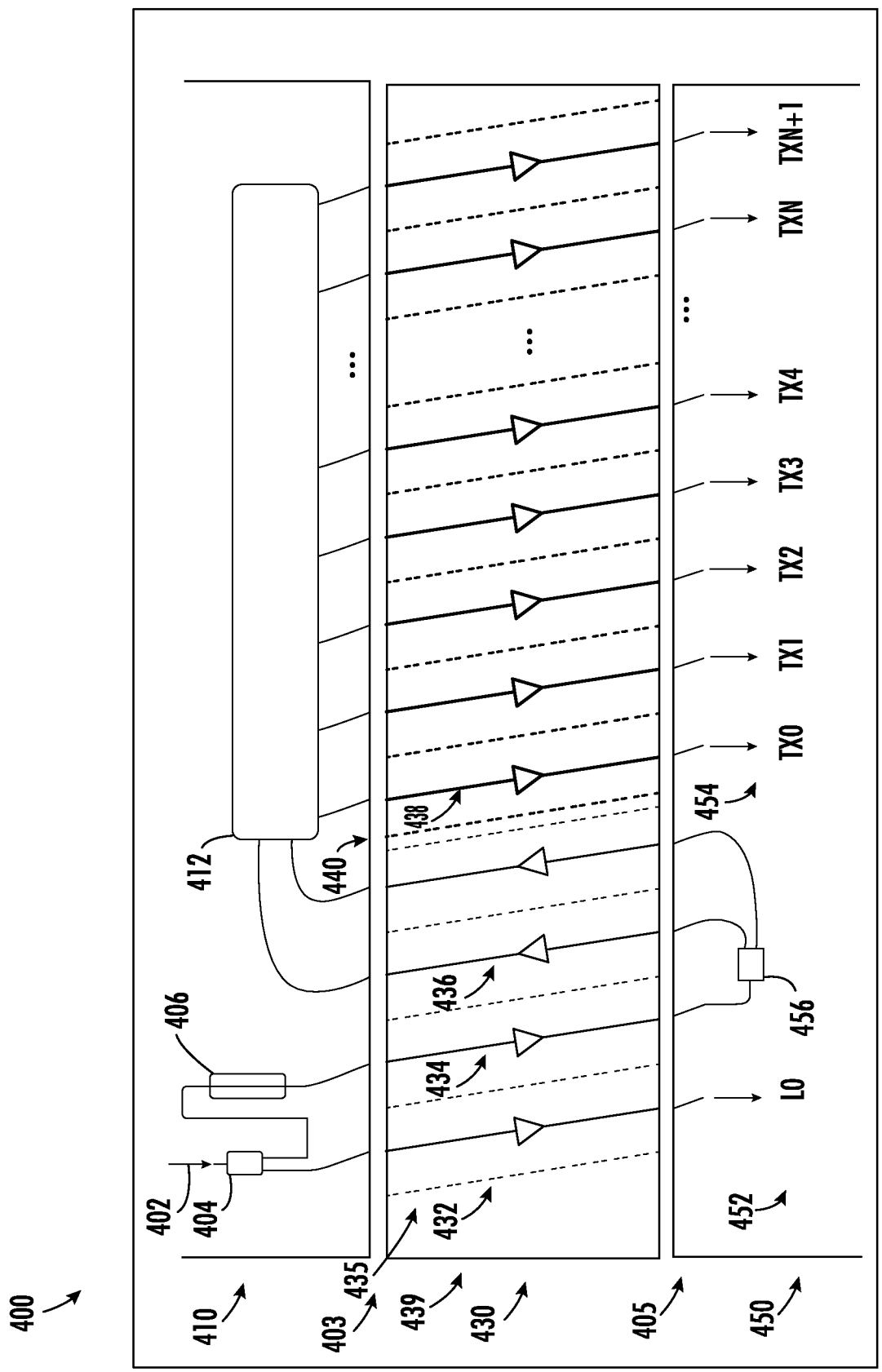
FIG. 4 depicts an example photonics integrated circuit according to some implementations of the present disclosure.

FIG. 4 depicts an example photonics integrated circuit 400 according to some implementations of the present disclosure. The PIC 400 can be included in a LIDAR system, such as the LIDAR system 200 of FIG. 2.

The PIC 400 can include a semiconductor die 430. The semiconductor die 430 can include a substrate having two or more semiconductor devices directly formed on the substrate. For instance, in some implementations, the semiconductor devices can each be formed on a common substrate of the semiconductor die 430. The substrate, the semiconductor devices, and/or the semiconductor die can be formed of a group III-V semiconductor material, such as, for example, indium phosphide (InP), gallium arsenide (GaAs), indium arsenide (InAs), gallium nitride (GaN), or indium antimonide (InSb).

According to example aspects of the present disclosure, the respective semiconductor stacks of the one or more semiconductor devices of the semiconductor die 430 can be isolated, such as electrically and/or physically isolated. For instance, the respective semiconductor stacks may not be coupled by any butt joints or other joining process. For instance, in conventional manufacturing processes, disparate semiconductor stacks may be joined by butt joints or other joining processes to assemble a PIC. Rather, the semiconductor stacks are directly formed on a common substrate by a manufacturing process such as MOVCD, where layers of the semiconductor stack are formed on each semiconductor device (e.g., by a deposition process), and etched away from semiconductor stacks for devices that do not include the layer.

The semiconductor die 430 can be coupled to at least one photonics die. For instance, the semiconductor die 430 can be coupled to a first photonics die 410 by a first optical interface 403. The semiconductor die 430 can additionally or alternatively be coupled to a second photonics die 450 by a second optical interface(s) 405. The optical interface(s) 403, 405 can be configured such that waveguides, lenses, or other structures for transmitting signals (e.g., electrical signals, light or laser signals, etc.) between the semiconductor die 430 and the first and second photonics dies 410, 450. The photonics dies 410, 450 can be silicon photonics dies. For instance, the photonics dies 410, 450 can be formed on a silicon substrate and/or formed of silicon layers.

Components depicted on the first photonics die 430 and second photonics die 450 are arranged as in FIG. 4 for the purpose of illustrating example aspects of the present disclosure. It should be understood by one having ordinary skill in the art that some components depicted on the first photonics die 410 may be positioned on the second photonics die 450 and components depicted on the second photonics die 450 may be positioned on the first photonics die 410 without deviating from the present disclosure. Still further, more or fewer photonics dies can be coupled to semiconductor die 430 without deviating from the present disclosure.

The first photonics die 410 can include or otherwise be in signal communication with a light source (e.g., laser source) 402. The laser source 402 can be configured to provide a beam (e.g., a laser beam) to the first photonics die 410 and the PIC 400. In some implementations, a local oscillator (LO) output 452 may be drawn from the laser source 402. The LO output 452 may be equivalent to the laser source 402 or may be modulated from the laser source 402 (e.g., by an LO modulator such as modulator 204B of FIG. 2). In particular, the first photonics die 410 can include a splitter 404 configured to split the beam from laser source 402 into a first beam provided to the LO output 452 and a second beam provided to other components of the PIC 400.

The laser source 402 can provide the beam to a modulator 406 (e.g., a phase modulator). The modulator 406 can be configured to modulate the beam to modify a phase and/or a frequency of the beam. In some embodiments, the modulator 406 can be a silicon phase modulator. The modulator 406 can modulate the beam by, for example, using Continuous Wave (CW) modulation or quasi-CW modulation. In some implementations, the modulator 406 can be disposed on the first photonics die 410.

The beam can be provided to one or more channels 435 of the semiconductor die 430. For instance, the channels 435 can be, can include, or can be a portion of a semiconductor device of the semiconductor die 430 configured to modify (e.g., modulate, amplify, etc.) the beam as it passes through the channels 435. For example, the channels 435 can be or can include amplification channels configured to amplify the beam as it passes through the channel. As another example, the channels 435 can be or can include modulation channels configured to modify the beam as it passes through the channels 435.

The PIC 400 (e.g., the first photonics die 410) can include a power distribution network 412. The power distribution network 412 can be configured to distribute the beam to the channels 435 of the semiconductor die 430. For instance, the power distribution network 412 can distribute the beam among the channels 435 based on power needs of the LIDAR system. Furthermore, in some implementations, the PIC 400 (e.g., the second photonics die 450) can include a splitter 456 disposed prior to the power distribution network 412 along the path of the beam through the PIC 400. Including a splitter 456 can reduce the magnitude of splitting that is later performed by power distribution network 412, which can in turn improve saturation of amplifiers in the channels 435.

In the example PIC 400 depicted in FIG. 4, the semiconductor devices can be associated with a preamplifier stage 439 and an amplifier stage 440. The preamplifier stage 439 can include one or more semiconductor devices (e.g., each having one or more channels) that are configured to amplify the beam to a particular amplitude prior to the amplifier stage 440. The particular amplitude can be greater than that of an amplitude of the beam from the laser source 402, but less than the amplitude requirements of the LIDAR system. Including a preamplifier stage 439 can improve saturation of the amplifiers in the amplifier stage 440.

For instance, as illustrated in FIG. 4, the preamplifier stage 439 can include an LO channel 432 configured to provide the LO signal 432 from the first photonics die 410 (e.g., from the splitter 404) to the LO output 452 on the second photonics die 450. Additionally, the channel 434 can be configured to deliver the modulated beam from modulator 406 to the splitter 456. The channels 436 can deliver the split beam from the splitter 456 to the inputs of power distribution network 412. Each of the channels 432, 434, 436 of the preamplifier stage 439 can have an associated gain. The gain for channels of the preamplifier stage 439 can be less than that of gain for channels of the amplifier stage 440. For instance, in some implementations, the gain for channels of the preamplifier stage 439 can be from about 5 mW per channel to about 50 mW per channel, such as about 10 mW per channel to about 30 mW per channel.

The PIC 400 can further include or be in communication with a transmitter configured to receive the beam from the semiconductor die 430. For instance, in some implementations, the second photonics die 450 can include a transmitter (not illustrated in FIG. 4) configured to receive the beam from the semiconductor die 430 (e.g., the channels 435 of the semiconductor die 430). The second photonics die 450 can include one or more Tx outputs 454 (e.g., Tx0, Tx1, etc.) corresponding to output channels of a LIDAR system. The Tx outputs 454 can be provided to the transmitter and optics to emit the beam from the LIDAR system.

As illustrated in FIG. 4, the amplifier stage 440 can include one or more channels 438 that are configured to amplify the beam that is provided to the TX outputs 454. For instance, each of the channels 438 can be or can include an optical amplifier having a gain. The gain of the channels 438 of the amplifier stage 440 can be greater than that of the gain for channels of the preamplifier stage 439. For instance, in some implementations, the gain of the channels 438 can be from about 100 mW per channel to about 350 mW per channel, such as from about 150 mW per channel to about 200 mW per channel.

Furthermore, in some implementations, a photonics die (e.g., the photonics die 450) can include a receiver configured to receive a reflected beam from one or more optics. The reflected beam can be reflected from a target. For instance, the optics can emit a beam from the transmitter at a target, which is reflected by the target. The optics can capture the reflected beam and provide it to the receiver. In some implementations, the transmitter and the receiver can collectively be disposed on a common photonics die (e.g., a transceiver die).

Figure 5:
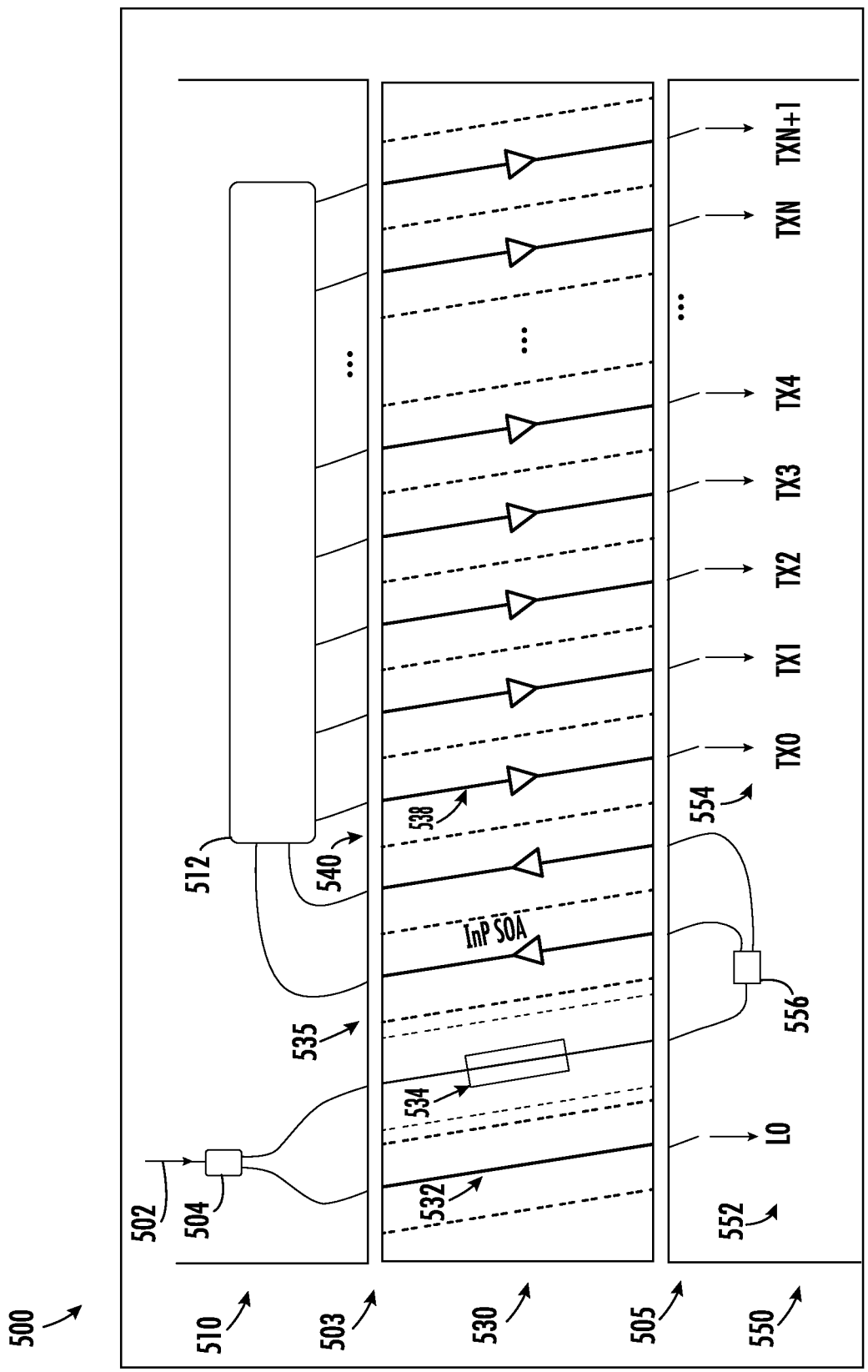
FIG. 5 depicts an example photonics integrated circuit according to some implementations of the present disclosure.

FIG. 5 depicts an example photonics integrated circuit 500 according to some implementations of the present disclosure. The PIC 500 can be included in a LIDAR system, such as the LIDAR system 200 of FIG. 2.

The PIC 500 can include a semiconductor die 530. The semiconductor die 530 can include a substrate having two or more semiconductor devices directly formed on the substrate. For instance, in some implementations, the semiconductor devices can each be formed on a common substrate of the semiconductor die 530. The substrate, the semiconductor devices, and/or the semiconductor die can be formed of a group III-V semiconductor material, such as, for example, indium phosphide (InP), gallium arsenide (GaAs), indium arsenide (InAs), gallium nitride (GaN), or indium antimonide (InSb).

According to example aspects of the present disclosure, the respective semiconductor stacks of the one or more semiconductor devices of the semiconductor die 530 can be isolated, such as electrically and/or physically isolated. For instance, the respective semiconductor stacks may not be coupled by any butt joints or other joining process. For instance, in conventional manufacturing processes, disparate semiconductor stacks may be joined by butt joints or other joining processes to assemble a PIC. Rather, the semiconductor stacks are directly formed on a common substrate by a manufacturing process such as MOVCD, where layers of the semiconductor stack are formed on each semiconductor device (e.g., by a deposition process), and etched away from semiconductor stacks for devices that do not include the layer.

The semiconductor die 530 can be coupled to at least one photonics die. For instance, the semiconductor die 530 can be coupled to a first photonics die 510 by a first optical interface 503. The semiconductor die 530 can additionally or alternatively be coupled to a second photonics die 550 by a second optical interface 505. The optical interface(s) 503, 505 can be configured such that waveguides, lenses, or other structures for transmitting signals (e.g., electrical signals, light or laser signals, etc.) between the semiconductor die 530 and the first and second photonics dies 510, 550. The photonics dies 510, 550 can be silicon photonics dies. For instance, the photonics dies 510, 550 can be formed on a silicon substrate and/or formed of silicon layers.

Components depicted on the first photonics die 530 and second photonics die 550 are arranged as in FIG. 5 for the purpose of illustrating example aspects of the present disclosure. It should be understood by one having ordinary skill in the art that some components depicted on the first photonics die 510 may be positioned on the second photonics die 550 and components depicted on the second photonics die 550 may be positioned on the first photonics die 510 without deviating from the present disclosure. Still further, more or fewer photonics dies can be coupled to semiconductor die 530 without deviating from the present disclosure.

The first photonics die 510 can include or otherwise be in signal communication with a light source (e.g., laser source) 502. The laser source 502 can be configured to provide a beam (e.g., a laser beam) to the first photonics die 510 and the PIC 500. In some implementations, a local oscillator (LO) output 552 may be drawn from the laser source 502. The LO output 552 may be equivalent to the laser source 502 or may be modulated from the laser source 502 (e.g., by an LO modulator such as modulator 204B of FIG. 2). In particular, the first photonics die 510 can include a splitter 504 configured to split the beam from laser source 502 into a first beam provided to the LO output 552 and a second beam provided to other components of the PIC 500.

The laser source 502 can provide the beam to a modulator 534 (e.g., a phase modulator). The modulator 534 can be configured to modulate the beam to modify a phase and/or a frequency of the beam. In some embodiments, the modulator 534 can be a silicon phase modulator. The modulator 534 can modulate the beam by, for example, using Continuous Wave (CW) modulation or quasi-CW modulation. In the example of FIG. 5, the modulator 534 is one of the semiconductor devices of the semiconductor die 530. For instance, the modulator 534 can be formed of a group III-V material to improve efficiency of the modulator 534.

The beam can be provided to one or more channels 535 of the semiconductor die 530. For instance, the channels 535 can be, can include, or can be a portion of a semiconductor device of the semiconductor die 530 configured to modify (e.g., modulate, amplify, etc.) the beam as it passes through the channels 535. For example, the channels 535 can be or can include amplification channels configured to amplify the beam as it passes through the channel. As another example, the channels 535 can be or can include an LO channel 532 configured to provide the beam from the laser source 502 to the LO output 552.

The PIC 500 (e.g., the first photonics die 510) can include a power distribution network 512. The power distribution network 512 can be configured to distribute the beam to the channels 535 of the semiconductor die 530. For instance, the power distribution network 512 can distribute the beam among the channels 535 based on power needs of the LIDAR system. Furthermore, in some implementations, the PIC 500 (e.g., the second photonics die 550) can include a splitter 556 disposed prior to the power distribution network 512 along the path of the beam through the PIC 500. Including a splitter 556 can reduce the magnitude of splitting that is later performed by power distribution network 512, which can in turn improve saturation of amplifiers in the channels 535.

The PIC 500 can further include or be in communication with a transmitter configured to receive the beam from the semiconductor die 530. For instance, in some implementations, the second photonics die 550 can include a transmitter (not illustrated in FIG. 5) configured to receive the beam from the semiconductor die 530 (e.g., the channels 535 of the semiconductor die 530). The second photonics die 550 can include one or more Tx outputs 554 (e.g., Tx0, Tx1, etc.) corresponding to output channels of a LIDAR system. The Tx outputs 554 can be provided to the transmitter and optics to emit the beam from the LIDAR system.

The semiconductor devices and/or the channels 535 of the semiconductor die 530 can be associated with an amplifier stage 540. The amplifier stage 540 can include one or more channels 538 that are configured to amplify the beam that is provided to the TX outputs 554. For instance, each of the channels 538 can be or can include an optical amplifier having a gain. For instance, in some implementations, the gain of the channels 538 can be from about 100 mW per channel to about 350 mW per channel, such as from about 150 mW per channel to about 200 mW per channel.

Furthermore, in some implementations, a photonics die (e.g., the photonics die 550) can include a receiver configured to receive a reflected beam from one or more optics. The reflected beam can be reflected from a target. For instance, the optics can emit a beam from the transmitter at a target, which is reflected by the target. The optics can capture the reflected beam and provide it to the receiver. In some implementations, the transmitter and the receiver can collectively be disposed on a common photonics die (e.g., a transceiver die).

Figure 6:
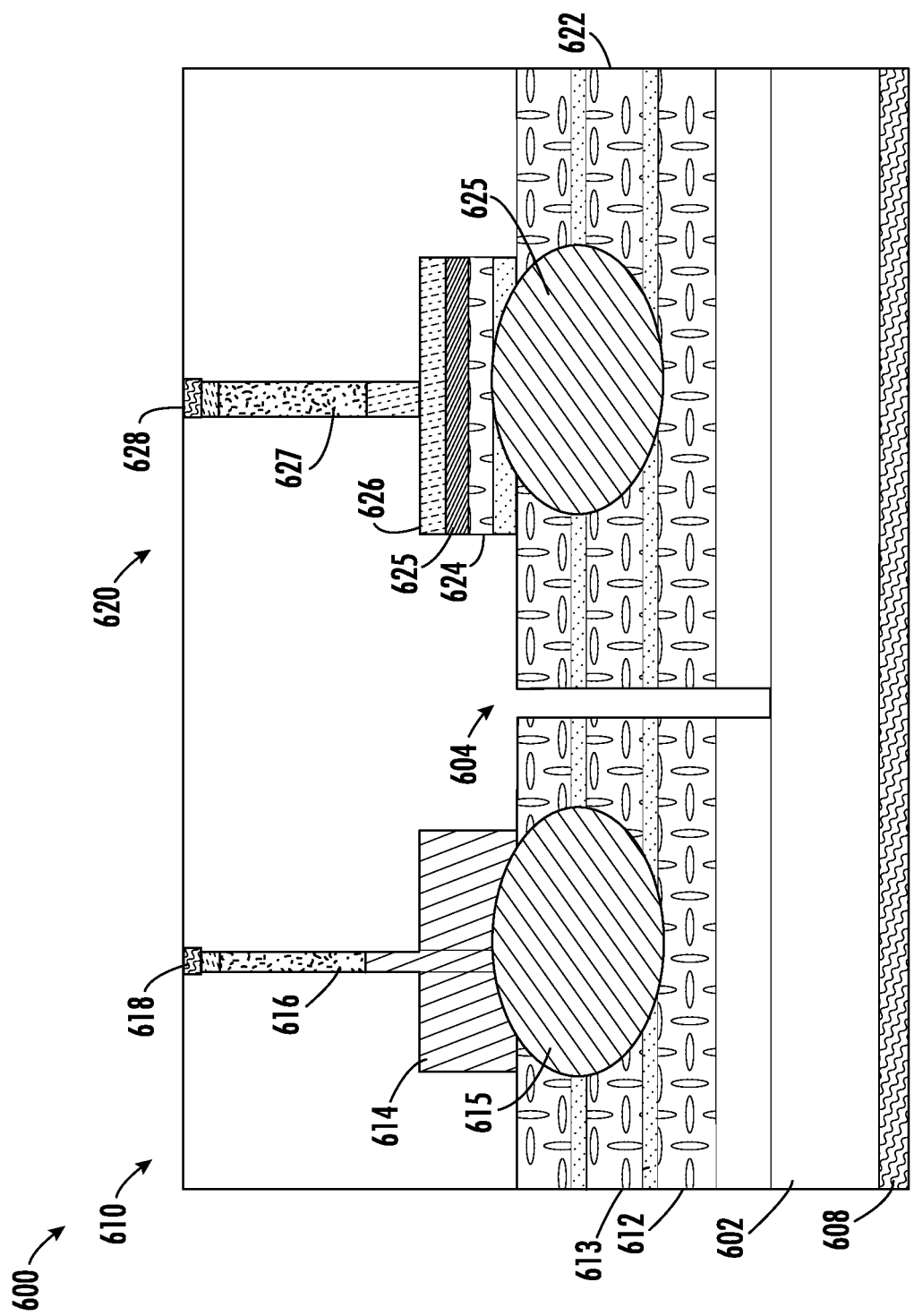
FIG. 6 depicts a cross-sectional view of an example semiconductor die according to some implementations of the present disclosure.

FIG. 6 depicts a cross-sectional view of an example semiconductor die 600 according to some implementations of the present disclosure. The semiconductor die 600 can be included in a LIDAR system, such as the LIDAR system 200 of FIG. 2.

The semiconductor die 600 can include a first semiconductor stack 610 (e.g., corresponding to a first semiconductor device) and a second semiconductor stack 620 (e.g., corresponding to a second semiconductor device) formed on a common substrate 602. The substrate 602 can be a metal substrate or semiconductor substrate, such as a substrate formed of crystalline silicon.

The first semiconductor stack 610 can have one or more waveguide layers 612. The second semiconductor stack 620 can have one or more waveguide layers 622. The waveguide layers 612, 622 can be configured to pass an optical signal (e.g., from a laser source) through the semiconductor stacks 610, 620. In some implementations, the waveguide layers 612, 622 can be formed of a group III-V semiconductor material. For instance, the group III-V semiconductor material can be or can include indium phosphide (InP), gallium arsenide (GaAs), indium arsenide (InAs), gallium nitride (GaN), indium antimonide (InSb), or another group III-V semiconductor material. A thickness of the waveguide layers 612, 622 can facilitate conductivity and thermal dissipation. In some implementations, the thickness of the waveguide layers 612, 622 can be from about 100 microns to about 300 microns.

In some implementations, the waveguide layers 612, 622 can be separated by one or more spacer layers 613, 623. The spacer layers 613, 623 can be formed of silicon dioxide ($SiO_2$) or another suitable material. The spacer layers 613, 623 can have a thickness of from about 1 micron to about 20 microns.

The waveguide layers 612, 622 can provide optical modes 615, 625 for integration with waveguides of adjacent components (e.g., photonics dies). The optical modes 615, 625 represent an intensity profile of light within the semiconductor stacks 610, 620.

In the example of FIG. 6, the first semiconductor stack 610 can be a modulator and the second semiconductor stack 620 can be an amplifier. The first semiconductor stack 610 includes an n-doped semiconductor layer 614, a p-doped group III-V semiconductor layer (e.g., InP) 616, and an insulating layer 618. The second semiconductor stack 620 includes an n-doped group III-V semiconductor (e.g., InP) layer 624, a multiple quantum wells (MQW) layer 626, a p-doped group III-V semiconductor (e.g., InP) layer 627, a p-doped group III-V semiconductor layer 628, and an insulating layer 629.

While the layers of semiconductor stacks 610, 620 have been described above with specific materials, it should be understood that the layers may be constructed of other materials, including but not limited to, indium phosphide (InP), gallium arsenide (GaAs), indium arsenide (InAs), gallium nitride (GaN), or indium antimonide (InSb).

The first semiconductor stack 610 and second semiconductor stack 620 can be isolated by a deep ridge etch 604. For instance, the deep ridge etch 604 can be etched from the top of the semiconductor die 600 to the surface of the substrate 602. The deep ridge etch 604 can isolate the first semiconductor stack 610 from the second semiconductor stack 620 such that each stack 610, 620 acts as an independent semiconductor device. For instance, light may not travel to/from the first semiconductor stack 610 from/to the second semiconductor stack 620 without passing through an adjacent component (e.g., a photonics die).

The substrate 602 can have an antireflection layer 608 formed on a surface opposite the first semiconductor stack 610 and/or the second semiconductor stack 620. The antireflection layer 608 can be formed of a material having a low reflectivity such that the antireflection layer 608 does not reflect a significant amount of light incident on the semiconductor die 600.

Additionally or alternatively, in some implementations, the antireflection layer 608 can be nonuniformly applied to the surface of the substrate 602 such that the antireflection layer 608 provides a smooth surface. For instance, the thickness of the antireflection layer 608 may be nonuniform such that the antireflection layer 608 compensates for variations in uniformity of the substrate 602 and/or the semiconductor stacks 610, 620, such as, for example, warping, uneven deposition, etc. caused by manufacturing processes.

The antireflection layer 608 can be applied to facilitate alignment between the semiconductor die 600 and other components of the LIDAR sensor system (e.g., the photonics dies, etc.). For instance, the antireflection layer 608 can be applied such that the optical modes 615, 625 of the semiconductor stacks 610, 620 are aligned with waveguides or other signal transmission modes of adjacent components (e.g., the photonics dies, etc.).

Figure 7:
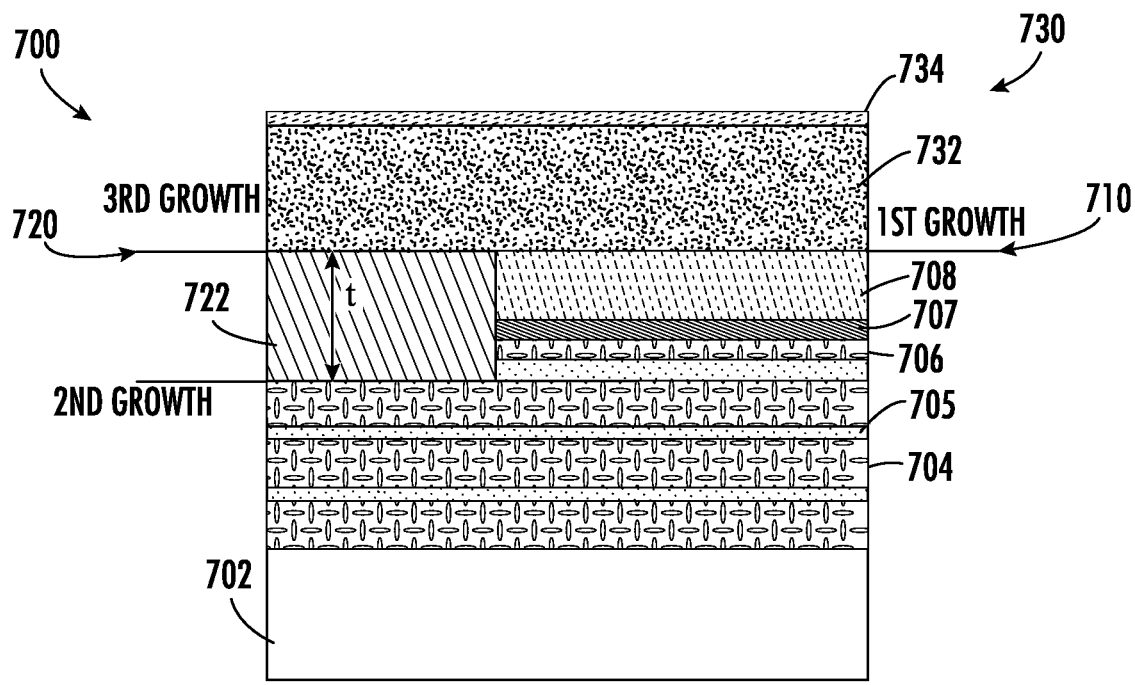
FIG. 7 depicts a cross-sectional view of an example intermediary semiconductor die according to some implementations of the present disclosure.

FIG. 7 depicts a cross-sectional view of an intermediary semiconductor die 700 according to some implementations of the present disclosure. The semiconductor die 700 can be manufactured into a semiconductor die (e.g., the semiconductor die 600) that can be included in a LIDAR system, such as the LIDAR system 200 of FIG. 2. In particular, FIG. 7 depicts varying growth stages for the manufacturing process of the intermediary semiconductor die 700.

The semiconductor die 700 can be subjected to a first growth stage 710. At this stage, one or more first layers can be grown on a substrate 702. The first layers can be grown by any suitable growth or regrowth process, such as, for example, metal-organic chemical vapor deposition (MOVCD). The first layers can include one or more waveguide layers 704, one or more spacer layers 705, an n-doped group III-V semiconductor (e.g., InP) layer 706, a multiple quantum wells (MQW) layer 707, and a p-doped group III-V semiconductor (e.g., INP) layer 708. For instance, the first layers can correspond to the layers of a first semiconductor stack (or first plurality of semiconductor stacks) to be formed on the substrate 702. During the first growth stage 710, these layers can be formed across the entire surface of the substrate 702 exposed to the growth process. This can include portions of the surface of the substrate 702 that will eventually become a second semiconductor stack.

After the first growth process, the portions of at least some of the first layers that are not associated with the first semiconductor stack can be etched away. For instance, a mask can be formed on the portions of the first layers that are associated with the first semiconductor stack such that the portions of the first layers associated with the first semiconductor stack remain after the etch process is complete. Some first layers that are common to each semiconductor stack (e.g., the waveguide layers 704 and/or spacer layers 705) may not be etched.

After etching away an etched portion of the first layers not associated with the first semiconductor stack, the semiconductor die 700 can be subjected to a second growth stage 720. During the second growth stage 720, one or more second layers are grown in the etched portions of the first layers. For instance, in the example of FIG. 7, the n-doped group III-V semiconductor (e.g., InP) layer 706, multiple quantum wells (MQW) layer 707, and p-doped group III-V semiconductor (e.g., InP) layer 708 are etched away at a depth (t) and replaced with a n-doped semiconductor layer 722 in the second growth stage 720. After the second growth stage 720, a second etch process may be performed on areas of the first semiconductor stack such that the second layers are not present in the first semiconductor stack after the second etch process.

The semiconductor die 700 can then be subjected to a third growth stage 730. At this stage, one or more third layers can be grown on the surface of the substrate 702 (e.g., on top of the first and/or second layers). In some implementations, the third layer(s) may be common to some or all of the semiconductor stacks on the semiconductor die 700. For instance, the third layer(s) can include a p-doped group III-V semiconductor layer 732 and/or an insulating layer 734.

Figure 8:
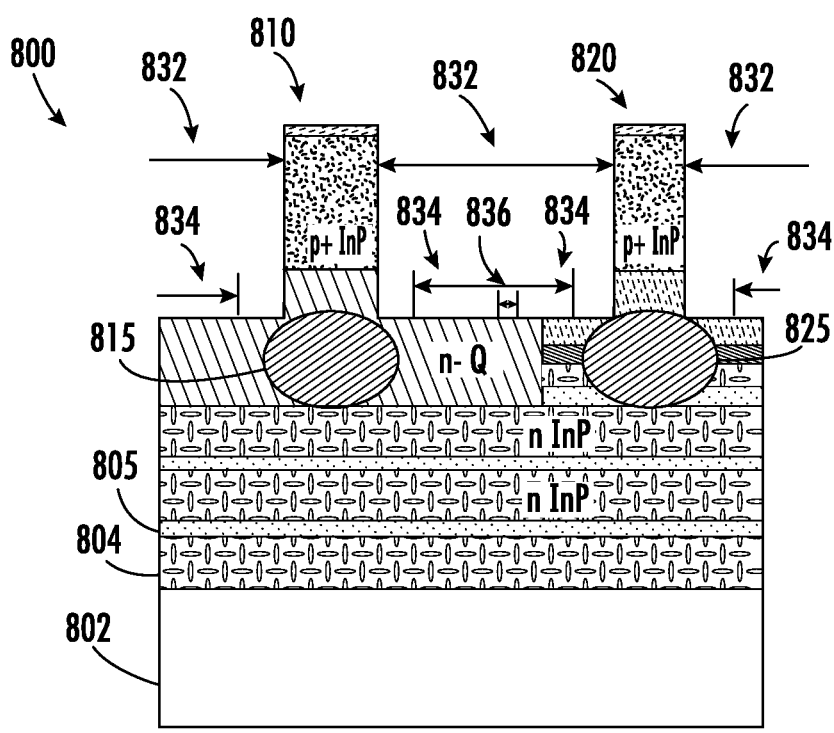
FIG. 8 depicts a cross-sectional view of an example intermediary semiconductor die according to some implementations of the present disclosure.

Next, the semiconductor die 700 may be subject to one or more etch processes to produce a final semiconductor die such as the semiconductor die 600 of FIG. 6. For instance, FIG. 8 depicts a cross-sectional view of an example intermediary semiconductor die 800 according to some implementations of the present disclosure. In particular, the semiconductor die 800 may be the semiconductor die 700 after being subject to one or more etch processes. The semiconductor die 800 can be manufactured into a PIC included in a LIDAR system, such as the LIDAR system 200 of FIG. 2.

In particular, FIG. 8 depicts a semiconductor die 800 having a substrate 802, one or more waveguide layers 804 and one or more spacer layers 805, a first semiconductor stack 810 (e.g., a modulator) and a second semiconductor stack 820 (e.g., an amplifier). The semiconductor die 800 can be subject to a first etch process at a first etch region 832 to produce the semiconductor die 800 from the semiconductor die 700 of FIG. 7. For instance, the semiconductor die 700 of FIG. 7 can be subject to an etch process where the regions of the surface of the semiconductor die 700 not included in the first etch region 832 are masked while the first etch region 832 is exposed to the etch process.

The first etch process can produce a semiconductor die 800 having optical modes 815, 825. As illustrated in FIG. 8, the optical modes 815, 825 are primarily concentrated in layers near the top of the die 800, instead of near the waveguide layers 804 as in the semiconductor die 600 of FIG. 6.

The semiconductor die 800 can then be subject to a second etch process at second etch region 834 to isolate the first semiconductor stack 810 from the second semiconductor stack 820. Additionally or alternatively, the semiconductor die 800 can be subject to a third etch process at third etch region 836 to produce a deep etch ridge in the waveguide layers 804. For instance, the semiconductor stacks 810, 820 can be isolated such that optical modes 815, 825 are moved towards the waveguide layers 804 as in the semiconductor die 600 of FIG. 6.

Figure 9:
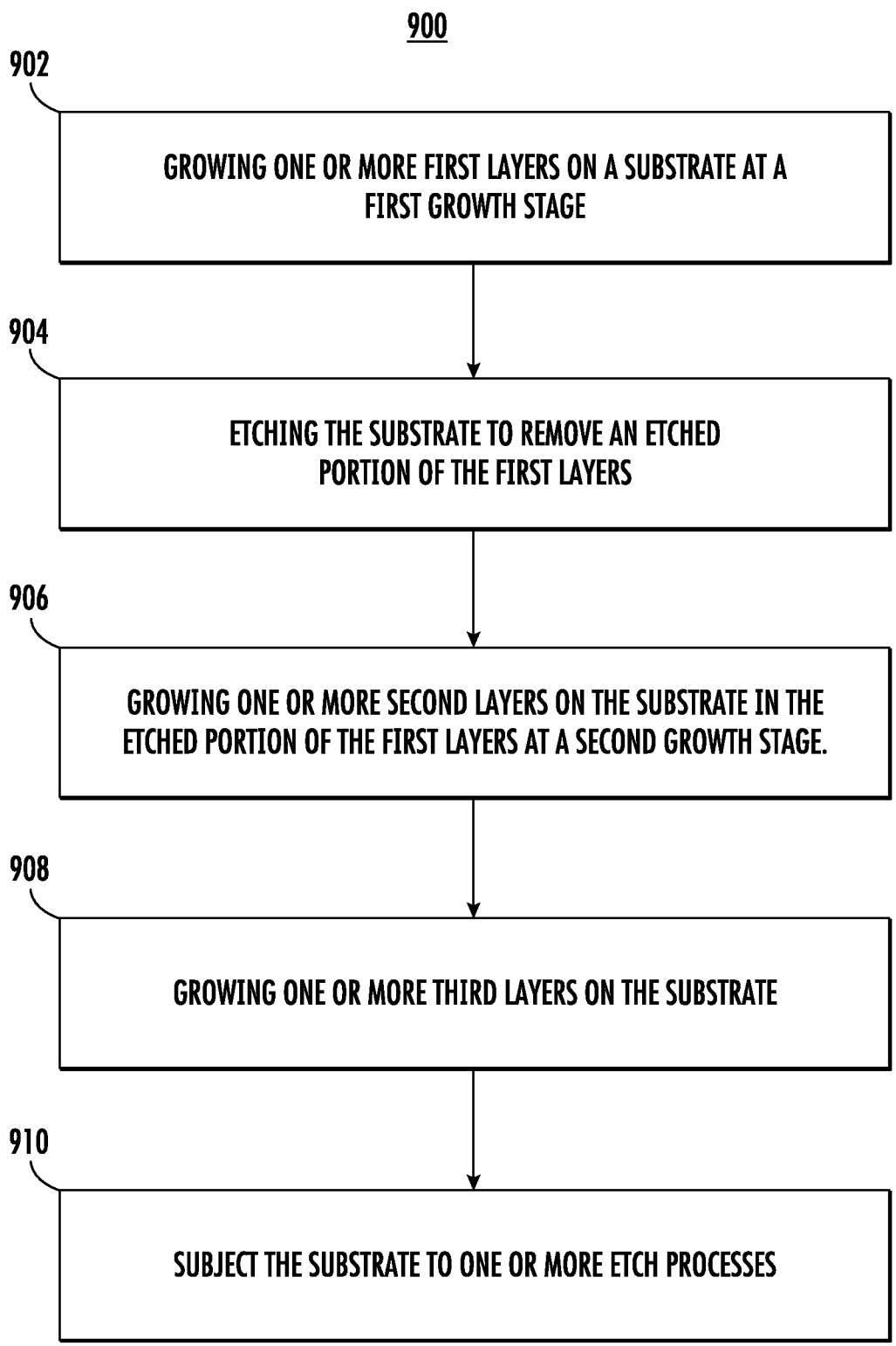
FIG. 9 depicts a flowchart diagram of an example method for producing a photonics integrated circuit according to some implementations of the present disclosure.

FIG. 9 depicts a flowchart diagram of an example method 900 for forming a photonics integrated circuit according to some implementations of the present disclosure. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

At 902, the method 900 can include growing one or more first layers on a substrate at a first growth stage. The substrate may be, for example, a metal substrate, a semiconductor die, and/or other suitable substrate. The first layers can be grown by any suitable growth or regrowth process, such as, for example, metal-organic chemical vapor deposition (MOVCD). The first layers can include one or more waveguide layers, one or more spacer layers, an n-doped group III-V semiconductor (e.g., InP) layer, a multiple quantum wells (MQW) layer, and a p-doped group III-V semiconductor (e.g., InP) layer. In some implementations, the one or more waveguide layers can be formed of a group III-V semiconductor material. For instance, the group III-V semiconductor material can be or can include one or more of indium phosphide (InP), gallium arsenide (GaAs), indium arsenide (InAs), gallium nitride (GaN), or indium antimonide (InSb).

The one or more first layers can be associated with a first semiconductor stack. For instance, the first layers can correspond to the layers of a first semiconductor stack (or first plurality of semiconductor stacks) to be formed on the substrate. For instance, the one or more first layers may be at least a portion of a semiconductor stack that will eventually form a first semiconductor device (e.g., an amplifier, a phase modulator, etc.). Although at least some of the first layers may be associated with a first semiconductor stack (e.g., and/or not associated with other semiconductor stacks on the substrate), the first layers may be grown in a greater region on the substrate than that corresponding to the first semiconductor stack. For instance, in some implementations, the first layers may be grown across an entire surface of the substrate.

At 904, the method 900 can include etching the substrate to remove an etched portion of the first layers. The etched portion may not be associated with a first semiconductor stack. For instance, a mask can be formed on the portions of the first layers that are associated with the first semiconductor stack such that the portions of the first layers associated with the first semiconductor stack remain after the etch process is complete. Some first layers that are common to each semiconductor stack (e.g., the waveguide layers and/or spacer layers) may not be etched.

At 906, the method 900 can include growing one or more second layers on the substrate in the etched portion of the first layer(s) at a second growth stage. The one or more second layer(s) can form a second semiconductor stack. During the second growth stage, one or more second layer(s) are grown in the etched portions of the first layers. For instance, in some implementations, the n-doped group III-V semiconductor (e.g., InP) layer, multiple quantum wells (MQW) layer, and/or p-doped group III-V semiconductor (e.g., InP) layer are etched away at a depth T and replaced with second layers in the second growth stage. The second layer(s) can include an n-doped semiconductor layer. In some implementations, after the second growth stage, a second etch process may be performed on areas of the first semiconductor stack such that the second layer(s) are not present in the first semiconductor stack after the second etch process.

In some implementations, at 908, the method 900 can further include growing one or more third layers on the substrate. The one or more third layers can be associated with both the first semiconductor stack and the second semiconductor stack. For instance, the one or more third layers can be grown on the portion of the first layers that are not etched in the etched portion and/or the second layers formed in the etched portion. The third layers can include a p-doped group III-V semiconductor layer, an insulating layer, and/or other suitable layers.

In some implementations, at 910, the method 900 can include subjecting the substrate to one or more etch processes. For instance, in some implementations, the method 900 can include etching a deep ridge etch in the substrate to isolate the first semiconductor stack from the second semiconductor stack. For instance, the deep ridge etch can be etched to isolate an optical mode of the first semiconductor stack from an optical mode of the second semiconductor stack. In some implementations, the method can include etching away a first etch region of the substrate in a first etch process. The first etch region can include at least a portion of the one or more third layers, the n-doped semiconductor layer, and the p-doped group III-V semiconductor layer. For instance, the first etch region can be a largest region. The first etch process can etch away a top portion of the layers formed on the substrate, such as the third layers. Additionally, in some implementations, the method can include etching away a second etch region of the substrate in a second etch process. The second etch region can include at least a portion of the n-doped semiconductor layer, the p-doped group III-V semiconductor layer, the multiple quantum wells layer, and the n-doped group III-V semiconductor layer. For instance, the second etch region can etch away some of the first and/or second layers. Additionally, in some implementations, the method can include etching away a third etch region of the substrate in a third etch process to form a deep ridge etch in the substrate. The third etch region includes at least a portion of the one or more waveguide layers and the one or more spacer layers.

For instance, one particular implementation of a method for forming a photonics integrated circuit according to example aspects of the present disclosure can include growing one or more first layers on a substrate at a first growth stage, the one or more first layers associated with a first semiconductor stack, the one or more first layers including one or more waveguide layers, one or more spacer layers, an n-doped group III-V semiconductor layer, a multiple quantum wells layer, and a p-doped group III-V semiconductor layer. The method can additionally include etching the substrate to remove an etched portion of the first layers not associated with the first semiconductor stack, the etched portion of the first layers not associated with the first semiconductor stack including an etched portion of the n-doped group III-V semiconductor layer, the multiple quantum wells layer, and the p-doped group III-V semiconductor layer. The method can additionally include growing one or more second layers on the substrate in the etched portion of the first layers at a second growth stage to form a second semiconductor stack, the one or more second layers including at least an n-doped semiconductor layer. The method can additionally include growing one or more third layers on the substrate, the one or more third layers associated with both the first semiconductor stack and the second semiconductor stack, the one or more third layers including a p-doped group III-V semiconductor layer and an insulating layer.

Additionally, in some implementations, the method can include etching away a first etch region of the substrate in a first etch process, the first etch region including at least a portion of the one or more third layers, the n-doped semiconductor layer, and the p-doped group III-V semiconductor layer; etching away a second etch region of the substrate in a second etch process, the second etch region including at least a portion of the n-doped semiconductor layer, the p-doped group III-V semiconductor layer, the multiple quantum wells layer, and the n-doped group III-V semiconductor layer; and/or etching away a third etch region of the substrate in a third etch process to form a deep ridge etch in the substrate, the third etch region including at least a portion of the one or more waveguide layers and the one or more spacer layers.

The following describes the technology of this disclosure within the context of a LIDAR system and an autonomous vehicle for example purposes only. As described herein, the technology described herein is not limited to an autonomous vehicle and can be implemented for or within other systems, autonomous platforms, and other computing systems.

What is claimed is:

1. A light detection and ranging (LIDAR) system for a vehicle, the LIDAR system comprising:
   a light source configured to output a beam;
   a photonics integrated circuit (PIC) comprising:
      a semiconductor die, the semiconductor die comprising a substrate having two or more semiconductor devices formed on the substrate, the two or more semiconductor devices configured to receive the beam from the light source and modify the beam, the two or more semiconductor devices comprising:
         a first modulator configured to output a transmit signal configured to interact with an object in an environment, wherein the transmit signal is configured to generate a returned signal in response to interaction with the object in the environment; and
         a second modulator configured to output a local signal; and
      at least one photonics die coupled to the semiconductor die, the at least one photonics die comprising at least a transmitter configured to receive the beam from the semiconductor die;
   a mixer configured to mix the returned signal and the local signal and to generate a down-converted signal based on the mix; and
   one or more optics configured to receive the beam from the transmitter and emit the beam towards the object in the environment of the vehicle.

2. The LIDAR system of claim 1, wherein the semiconductor die comprises one or more channels, at least one of the one or more channels respectively comprising the one or more semiconductor devices, and wherein the at least one photonics die comprises one or more waveguides respectively coupled to the one or more channels.

3. The LIDAR system of claim 2, wherein:
   the semiconductor die has a particular facet; and
   an input of at least a first channel of the one or more channels and an output of at least a second channel of the one or more channels are positioned on the particular facet of the semiconductor die.

4. The LIDAR system of claim 2, wherein the at least one photonics die comprises a power distribution network configured to receive the beam and distribute the beam to the one or more channels of the one or more semiconductor devices.

5. The LIDAR system of claim 1, wherein the at least one photonics die comprises at least one silicon photonics die.

6. The LIDAR system of claim 1, wherein the semiconductor die comprises a group III-V semiconductor die, and wherein the one or more semiconductor devices comprise one or more group III-V semiconductor devices.

7. The LIDAR system of claim 6, wherein the group III-V semiconductor devices comprise indium phosphide devices, boron nitride devices, or gallium arsenide devices.

8. The LIDAR system of claim 1, wherein at least one of the two or more semiconductor devices comprises an amplifier stage, the amplifier stage configured to receive the beam from the light source and amplify the beam.

9. The LIDAR system of claim 8, wherein the two or more semiconductor devices comprise a preamplifier stage configured to receive the beam from the light source and amplify the beam to a particular amplitude and provide the beam at the particular amplitude to the amplifier stage.

10. The LIDAR system of claim 1, wherein:
a respective semiconductor stack comprises the two or more semiconductor devices on the substrate; and
the respective semiconductor stacks of the one or more semiconductor devices are isolated.

11. The LIDAR system of claim 1, wherein the at least one photonics die further comprises a receiver configured to receive a reflected beam from the one or more optics, the reflected beam being reflected from the object.

12. The LIDAR system of claim 11, wherein the at least one photonics die comprises a transceiver die, wherein the transmitter and the receiver are disposed on the transceiver die.

13. An autonomous vehicle control system, comprising:
a photonics integrated circuit (PIC), the PIC comprising:
    a semiconductor die, the semiconductor die comprising a substrate having two or more semiconductor devices directly formed on the substrate, the two or more semiconductor devices configured to receive a beam from a light source and modify the beam, the two or more semiconductor devices comprising:
        a first modulator configured to output a transmit signal configured to interact with an object in an environment, wherein the transmit signal is configured to generate a returned signal in response to interaction with the object in the environment; and
        a second modulator configured to output a local signal, wherein the local signal and the returned signal are configured to be mixed to generate a down-converted signal; and
    at least one photonics die coupled to the semiconductor die, the at least one photonics die comprising at least a transmitter configured to receive the beam from the semiconductor die.

14. The autonomous vehicle control system of claim 13, wherein the semiconductor die comprises a group III-V semiconductor die, and wherein the one or more semiconductor devices comprise one or more group III-V semiconductor devices.

15. The autonomous vehicle control system of claim 13, wherein at least one of the two or more semiconductor devices comprises an amplifier stage, the amplifier stage configured to receive the beam from the light source and amplify the beam.

16. The autonomous vehicle control system of claim 15, wherein the two or more semiconductor devices comprise a preamplifier stage configured to receive the beam from the light source and amplify the beam to a particular amplitude and provide the beam at the particular amplitude to the amplifier stage.

17. The autonomous vehicle control system of claim 13, wherein:
a respective semiconductor stack comprises the two or more semiconductor devices on the substrate; and
the respective semiconductor stacks of the two or more semiconductor devices are isolated.

18. An autonomous vehicle, comprising:
an autonomous vehicle control system, the autonomous vehicle control system comprising one or more processors; and
a light detection and ranging (LIDAR) system, the LIDAR system comprising:
    a light source configured to output a beam;
    a photonics integrated circuit (PIC) comprising:
        a semiconductor die, the semiconductor die comprising a substrate having two or more semiconductor devices formed on the substrate, the two or more semiconductor devices configured to receive the beam from the light source and modify the beam, the two or more semiconductor devices comprising:
            a first modulator configured to output a transmit signal configured to interact with an object in an environment, wherein the transmit signal is configured to generate a returned signal in response to interaction with the object in the environment; and
            a second modulator configured to output a local signal; and
        at least one photonics die coupled to the semiconductor die, the at least one photonics die comprising at least a transmitter configured to receive the beam from the semiconductor die; and
one or more optics configured to receive the beam from the transmitter and emit the beam towards the object in the environment of the autonomous vehicle.

* * * * *